United States Patent
McCarty et al.

(10) Patent No.: US 11,387,993 B2
(45) Date of Patent: Jul. 12, 2022

(54) QUANTUM INFORMATION INTERCEPTION PREVENTION

(71) Applicant: Accenture Global Solutions Limited, Dublin (IE)

(72) Inventors: Benjamin Glen McCarty, Washington, DC (US); Malek Ben Salem, Falls Church, VA (US)

(73) Assignee: Accenture Global Solutions Limited, Dublin (IE)

( * ) Notice: Subject to any disclaimer, the term of this patent is extended or adjusted under 35 U.S.C. 154(b) by 89 days.

(21) Appl. No.: 16/926,325

(22) Filed: Jul. 10, 2020

(65) Prior Publication Data
US 2022/0014364 A1  Jan. 13, 2022

(51) Int. Cl.
*H04L 9/08* (2006.01)

(52) U.S. Cl.
CPC .................. *H04L 9/0858* (2013.01)

(58) Field of Classification Search
CPC ..................................... H04L 9/0858
See application file for complete search history.

(56) References Cited

U.S. PATENT DOCUMENTS

| | | | |
|---|---|---|---|
| 5,768,297 A * | 6/1998 | Shor | B82Y 10/00 714/763 |
| 6,578,018 B1 * | 6/2003 | Ulyanov | B82Y 10/00 706/14 |
| 2002/0106084 A1 * | 8/2002 | Azuma | B82Y 10/00 380/263 |
| 2005/0157875 A1 * | 7/2005 | Nishioka | H04B 10/70 380/46 |
| 2011/0142242 A1 | 6/2011 | Tanaka | |

(Continued)

FOREIGN PATENT DOCUMENTS

WO  WO 2020/113095  6/2020

OTHER PUBLICATIONS

Mohr, "A Survey of Zero-Knowledge Proofs with Applications to Cryptography," Southern Illinois University at Carbondale, Apr. 24, 2007, 12 pages.

(Continued)

*Primary Examiner* — Matthew Smithers
(74) *Attorney, Agent, or Firm* — Fish & Richardson P.C.

(57) ABSTRACT

Methods, systems, and apparatus for transmitting qubits encoding quantum information with reduced risk of interception from an eavesdropper. In one aspect, a method includes encoding quantum information into an information qubit; encrypting the information qubit, comprising performing i) a parity operation on the information qubit and a parity control qubit and ii) a phase operation on the information qubit and a phase control qubit; performing, by a sender party, a sequence of one or more quantum logic gates on the phase control qubit; sending the information qubit, parity control qubit, and phase control qubit to a recipient party; and sending data identifying the sequence of one or more quantum logic gates to the recipient party, wherein the recipient party obtains the quantum information encoded into the information qubit using the information qubit, parity control qubit, phase control qubit, and data identifying the sequence of one or more quantum logic gates.

20 Claims, 22 Drawing Sheets

(56) References Cited

U.S. PATENT DOCUMENTS

| | | | | |
|---|---|---|---|---|
| 2011/0280405 | A1* | 11/2011 | Habit | H04L 9/0858 |
| | | | | 380/278 |
| 2020/0118025 | A1* | 4/2020 | Romero | G06N 3/0454 |
| 2020/0119748 | A1* | 4/2020 | Lucarelli | H03M 13/11 |
| 2020/0192417 | A1* | 6/2020 | Fernandes Ramos | G06N 10/00 |
| 2021/0103847 | A1* | 4/2021 | Akzam | H03M 1/66 |
| 2021/0109707 | A1* | 4/2021 | McCarty | G06F 17/145 |
| 2021/0124640 | A1* | 4/2021 | Nickerson | G06F 11/10 |
| 2021/0232963 | A1* | 7/2021 | Gimeno-Segovia | G06N 10/00 |

OTHER PUBLICATIONS

Shor, "Polynomial-Time Algorithms for Prime Factorization and Discrete Logarithms on a Quantum Computer," arXiv:quant-ph/9508027v2, Jan. 25, 1996, 28 pages.

EP Extended Search Report in European Appln. No. 21167260.5, dated Sep. 23, 2021, 7 pages.

\* cited by examiner

QUANTUM INFORMATION INTERCEPTION PREVENTION

TECHNICAL FIELD

This specification relates to the fields of cryptography, computer security, and quantum computing.

BACKGROUND

In cryptography and computer security, a man-in-the-middle attack (MITM) is an attack where an attacker secretly relays or alters communications between a sender party and recipient party who believe that they are directly communicating with each other. One example MITM attack is active eavesdropping. During active eavesdropping, an attacker makes independent connections with the sender party and recipient party and relays messages between them to make them believe they are talking directly to each other over a private connection. For MITM attacks to be successful, the attacker must be able to successfully intercept all relevant messages passing between the two parties and inject new ones.

SUMMARY

This specification describes systems, methods, devices and other techniques for preventing interception of quantum information through quantum encryption and qubit integrity protection.

In general, one innovative aspect of the subject matter described in this specification can be implemented in a method that includes encoding, by a sender party, quantum information into an information qubit; encrypting, by the sender party, the information qubit, comprising performing i) a parity operation on the information qubit and a parity control qubit and ii) a phase operation on the information qubit and a phase control qubit; performing, by a sender party, a sequence of one or more quantum logic gates on the phase control qubit; sending, by the sender party, the information qubit, parity control qubit, and phase control qubit to a recipient party; and sending, by the sender party, data identifying the sequence of one or more quantum logic gates to the recipient party, wherein the recipient party obtains the quantum information encoded into the information qubit based on the information qubit, parity control qubit, phase control qubit, and data identifying the sequence of one or more quantum logic gates.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the parity operation comprises a CNOT quantum logic gate that targets the parity control qubit and uses the information qubit as a control.

In some implementations the phase operation comprises a sign flip operation.

In some implementations performing the phase operation on the information qubit and the phase control qubit comprises: applying a Hadamard gate to the phase control qubit; and applying a CNOT quantum logic gate that targets the information qubit and uses the phase control qubit as a control.

In some implementations the sequence of one or more quantum logic gates comprises a non-palindromic sequence of one or more quantum logic gates.

In some implementations the sequence of one or more quantum logic gates comprises a secret sequence of one or more quantum logic gates known only to the sender party.

In some implementations the one or more quantum logic gates in the sequence of one or more quantum logic gates comprise quantum logic gates from a set of universal quantum logic gates.

In some implementations the sequence of one or more quantum logic gates is i) non-equivalent to an identity operation, ii) non-equivalent to a stabilizer operator from a stabilizer code, or iii) non-equivalent to an identity operation and non-equivalent to a stabilizer operator from a stabilizer code.

In some implementations the method further comprises determining, by the sender party, the sequence of one or more quantum logic gates, comprising randomly selecting the one or more quantum logic gates from a predetermined set of quantum logic gates.

In some implementations the sequence of one or more quantum logic gates comprises a predetermined sequence of one or more quantum logic gates.

In some implementations sending, by the sender party, the information qubit, parity control qubit, and phase control qubit to the recipient party comprises: establishing a communication channel with the recipient party; sending, from the sender party and to the recipient party, the information qubit via the communication channel; receiving, by the sender party and from the recipient party, an acknowledgement of receipt of the information qubit; sending, from the sender party and to the recipient party, the phase control qubit and bit control qubit via the communication channel.

In some implementations sending data identifying the sequence of one or more quantum logic gates to the recipient party comprises sending data identifying the sequence of one or more quantum logic gates to the recipient party over a secure Out-of-Band channel.

In some implementations obtaining, by the recipient party, the quantum information encoded into the information qubit based on the information qubit, parity control qubit, phase control qubit, and data identifying the sequence of one or more quantum logic gates comprises: performing a reverse of sequence of one or more quantum logic gates on the phase control qubit; performing i) a reverse of the parity operation on the information qubit and the parity control qubit and ii) a reverse of the phase operation on the information qubit and the phase control qubit; measuring the phase control qubit and bit control qubit to obtain respective measurement results; determining whether the measurement results indicate that both the phase control qubit and bit control qubit are in an off state or not; and in response to determining that measurement results indicate that both the phase control qubit and bit control qubit are not in an off state, requesting reissue by the sender party; or in response to determining that measurement results indicate that both the phase control qubit and bit control qubit are in an off state, either i) measuring the information qubit, or ii) performing additional operations and delayed measurements on the information qubit.

In some implementations the phase control qubit is prepared in an initial state, the initial state comprising a computational basis state.

In some implementations the information qubit comprises a first information qubit, and the method further comprises: encoding, by the sender party, quantum information into a second information qubit; entangling, by the sender party, the first information qubit and second information qubit; and sending, by the sender party, the second information qubit to the recipient party, wherein the recipient party obtains the quantum information encoded into the first information qubit and second information qubit based on the first information qubit, second information qubit, parity control qubit, phase control qubit, and data identifying the sequence of one or more quantum logic gates.

In some implementations entangling the first information qubit and second information qubit comprises: applying a Hadamard gate to the first information qubit; applying a CNOT gate to the first information qubit and the second information qubit, wherein the first information qubit acts as a control and the CNOT gate targets the second information qubit; and applying a Pauli-Y gate to the first information qubit.

In some implementations the parity control qubit comprises a first parity control qubit and the phase control qubit comprises a first phase control qubit; encrypting the information qubit further comprises performing i) the parity operation on the information qubit and a second parity control qubit and ii) the phase operation on the information qubit and a second phase control qubit; and the method further comprises: performing, by the sender party, the sequence of one or more quantum logic gates on the second phase control qubit, sending, by the sender party, the second parity control qubit and the second phase control qubit to a recipient party, wherein the recipient party obtains the quantum information encoded into the information qubit based on the information qubit, first parity control qubit, first phase control qubit, second parity control qubit, second phase control qubit and data identifying the sequence of one or more quantum logic gates.

In general, another innovative aspect of the subject matter described in this specification can be implemented in a method that includes receiving, by a recipient party and from a sender party, i) an information qubit, ii) a parity control qubit, and iii) a phase control qubit, wherein the information qubit encodes quantum information; receiving, by the recipient party and from the sender party, data identifying a sequence of one or more quantum logic gates; obtaining, by the recipient party, the quantum information encoded in the information qubit, comprising: performing an inverse of the sequence of one or more quantum logic gates on the phase control qubit; decrypting the information qubit, comprising performing i) an inverse phase operation on the information qubit and phase control qubit and ii) an inverse parity operation on the information qubit and the parity control qubit; and measuring the information qubit.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

In general, another innovative aspect of the subject matter described in this specification can be implemented in a method that includes encoding, by a sender party, quantum information into an information qubit; encrypting, by the sender party, the information qubit, comprising: performing i) a parity operation on the information qubit and a parity control qubit and ii) a phase operation on the information qubit and a phase control qubit; and performing a sequence of one or more quantum logic gates on the phase control qubit; sending, by the sender party, the encrypted information qubit to a recipient party, wherein the recipient party performs one or more operations on the encrypted information qubit; receiving, by the sender party and from the recipient party, the encrypted information qubit; and decrypting, by the sender party, the encrypted information qubit received from the recipient party.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations decrypting the encrypted information qubit received from the recipient party comprises: performing an inverse of the sequence of one or more quantum logic gates on the phase control qubit; and performing i) an inverse of the parity operation on the information qubit and a parity control qubit and ii) an inverse of the phase operation on the information qubit and a phase control qubit.

In some implementations the method further comprises measuring, by the sender party, the decrypted information qubit; or performing, by the sender party, additional operations and delayed measurement of the information qubit.

In some implementations the method further comprises sending, by the sender party and to the recipient party, data identifying a quantum computation to perform on the encrypted information qubit, wherein the one or more operations performed on the encrypted information qubit by the recipient party perform the quantum computation.

In some implementations the parity operation comprises a CNOT quantum logic gate that targets the parity control qubit and uses the information qubit as a control.

In some implementations the phase operation comprises a sign flip operation.

In some implementations performing the phase operation on the information qubit and the phase control qubit comprises: applying a Hadamard gate to the phase control qubit;

and applying a CNOT quantum logic gate that targets the information qubit and uses the phase control qubit as a control.

In some implementations the sequence of one or more quantum logic gates comprises one or more of i) a non-palindromic sequence of one or more quantum logic gates, or ii) a secret sequence of one or more quantum logic gates known only to the sender party.

In some implementations the one or more quantum logic gates in the sequence of one or more quantum logic gates comprise quantum logic gates from a set of universal quantum logic gates.

In some implementations the sequence of one or more quantum logic gates is i) non-equivalent to an identity operation, ii) non-equivalent to a stabilizer operator from a stabilizer code, or iii) non-equivalent to an identity operation and non-equivalent to a stabilizer operator from a stabilizer code.

In some implementations the method further comprises determining, by the sender party, the sequence of one or more quantum logic gates, comprising randomly selecting the one or more quantum logic gates from a predetermined set of quantum logic gates.

In some implementations the sequence of one or more quantum logic gates comprises a predetermined sequence of one or more quantum logic gates.

In some implementations sending, by the sender party, the encrypted information qubit to the recipient party comprises: establishing a communication channel with the recipient party; sending, from the sender party and to the recipient party, the information qubit via the communication channel.

In some implementations the information qubit comprises a first information qubit, and wherein the method further comprises: encoding, by the sender party, quantum information into a second information qubit; entangling, by the sender party, the first information qubit and second information qubit; and sending, by the sender party, the second information qubit to the recipient party, wherein the recipient party performs one or more operations on the entangled first information qubit and second information qubit.

In some implementations entangling the first information qubit and second information qubit comprises: applying a Hadamard gate to the first information qubit; applying a CNOT gate to the first information qubit and the second information qubit, wherein the first information qubit acts as a control and the CNOT gate targets the second information qubit; and applying a Pauli-Y gate to the first information qubit.

In general, another innovative aspect of the subject matter described in this specification can be implemented in a method that includes receiving, by a recipient party and from a sender party, an information qubit, wherein the information qubit comprises a qubit that encodes quantum information and is encrypted by performing i) a parity operation on the information qubit and a parity control qubit and ii) a phase operation on the information qubit and a phase control qubit and performing a sequence of one or more quantum logic gates on the phase control qubit; performing, by the recipient party, one or more operations on the received information qubit; and returning, from the recipient party the information qubit to the sender party.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the method further comprises receiving, by the recipient party and from the sender party, data identifying a quantum computation to perform on the information qubit, and wherein performing one or more operations on the received information qubit comprises performing the quantum computation on the received information qubit.

In some implementations performing the quantum computation on the information qubit comprises performing a known or secret quantum algorithm on the information qubit.

In general, another innovative aspect of the subject matter described in this specification can be implemented in a method that includes encoding, by a sender party, quantum information into an information qubit; encrypting, by the sender party, the information qubit, comprising: performing i) a parity operation on the information qubit and a parity control qubit and ii) a phase operation on the information qubit and a phase control qubit; and performing a sequence of one or more quantum logic gates on the phase control qubit; sending, by the sender party, the encrypted information qubit to a trusted third party; and sending, by the sender party, the parity control qubit, phase control qubit and data identifying the sequence of one or more quantum logic gates to a recipient party, wherein the recipient party obtains the quantum information encoded into the encrypted information qubit in response to receiving the encrypted information qubit from the trusted third party after the trusted third party determines that terms and conditions of a smart contract are met and based on the information qubit, parity control qubit, phase control qubit, and data identifying the sequence of one or more quantum logic gates.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the method further comprises, prior to sending the encrypted information qubit to the trusted third party: signing, by the sender party, terms and conditions of the smart contract.

In some implementations the parity operation comprises a CNOT quantum logic gate that targets the parity control qubit and uses the information qubit as a control.

In some implementations the phase operation comprises a sign flip operation.

In some implementations performing the phase operation on the information qubit and the phase control qubit comprises: applying a Hadamard gate to the phase control qubit; and applying a CNOT quantum logic gate that targets the information qubit and uses the phase control qubit as a control.

In some implementations the sequence of one or more quantum logic gates comprises a non-palindromic sequence of one or more quantum logic gates.

In some implementations the sequence of one or more quantum logic gates comprises a secret sequence of one or more quantum logic gates known only to the sender party.

In some implementations the one or more quantum logic gates in the sequence of one or more quantum logic gates comprise quantum logic gates from a set of universal quantum logic gates.

In some implementations the sequence of one or more quantum logic gates is i) non-equivalent to an identity operation, ii) non-equivalent to a stabilizer operator from a stabilizer code, or iii) non-equivalent to an identity operation and non-equivalent to a stabilizer operator from a stabilizer code.

In some implementations the method further comprises determining, by the sender party, the sequence of one or more quantum logic gates, comprising randomly selecting the one or more quantum logic gates from a predetermined set of quantum logic gates.

In some implementations the sequence of one or more quantum logic gates comprises a predetermined sequence of one or more quantum logic gates.

In some implementations sending, by the sender party, the encrypted information qubit to a trusted third party comprises: establishing a communication channel with the trusted third party; and sending, from the sender party and to the trusted third party, the encrypted information qubit via the communication channel.

In some implementations sending, by the sender party, the parity control qubit, phase control qubit and data identifying the sequence of one or more quantum logic gates to a recipient party comprises: establishing a communication channel with the recipient party; sending, from the sender party and to the recipient party, the parity control qubit and phase control qubit via the communication channel; and sending data identifying the sequence of one or more quantum logic gates to the recipient party over a secure Out-of-Band channel.

In general, another innovative aspect of the subject matter described in this specification can be implemented in a method that includes receiving, by a recipient party and from a sender party, a parity control qubit, phase control qubit and data identifying a sequence of one or more quantum logic gates; receiving, by the recipient party and from a trusted third party, an information qubit encoding quantum information; and obtaining, by the recipient party, quantum information encoded in the information qubit, comprising: performing an inverse of the sequence of one or more quantum logic gates on the phase control qubit; decrypting the information qubit, comprising performing i) an inverse phase operation on the information qubit and phase control qubit and ii) an inverse parity operation on the information qubit and the parity control qubit; and measuring the information qubit Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include the following feature. In some implementations the method further comprises, prior to receiving the parity control qubit, phase control qubit and data identifying a sequence of one or more quantum logic gates, signing, by the recipient party, terms and conditions of a smart contract.

In general, another innovative aspect of the subject matter described in this specification can be implemented in a method that includes receiving, from a sender party, an information qubit, wherein the information qubit comprises a qubit that encodes quantum information and is encrypted by performing i) a parity operation on the information qubit and a parity control qubit and ii) a phase operation on the information qubit and a phase control qubit and performing a sequence of one or more quantum logic gates on the phase control qubit; receiving, from a recipient party, data indicating receipt of i) a parity control qubit, ii) a phase control qubit, and iii) data identifying a sequence of one or more quantum logic gates; determining whether terms and conditions of a smart contract between the sender party and recipient party are met; and in response to determining that the terms and conditions of the smart contract between the sender party and recipient party are met, transmitting the information qubit to the recipient party.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include the following feature. In some implementations the method further comprises providing the sender party and recipient party with the terms and conditions of the smart contract; receiving, from the sender party, signed terms and conditions of the smart contract; and receiving, from the recipient party, signed terms and conditions of the smart contract.

The subject matter described in this specification can be implemented in particular ways so as to realize one or more of the following advantages.

A sender party implementing the presently described techniques can transmit qubits encoding quantum information to a recipient party with reduced risk that an eavesdropper intercepts the qubits and learns the quantum information encoded in the qubits. The quantum information can remain confidential, its integrity protected. Further, the presently described techniques are robust against different types of attacks, e.g., MITM attacks, MITM attacks with guessing, or forgery.

In addition, the presently described encryption techniques include quantum computing operations that can be chosen to be universal, elementary, e.g., including only single or two-qubit gates, and/or in the Clifford-group. Expensive operations, e.g., implementations of T gates can be avoided. Implementations of the required quantum computations can therefore be computationally stable, efficient and quantum hardware agnostic.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes methods and systems that enable a sender party to transmit qubits encoding quantum information to a recipient party with reduced risk of an eavesdropper learning the encoded quantum information.

Figure 1A:
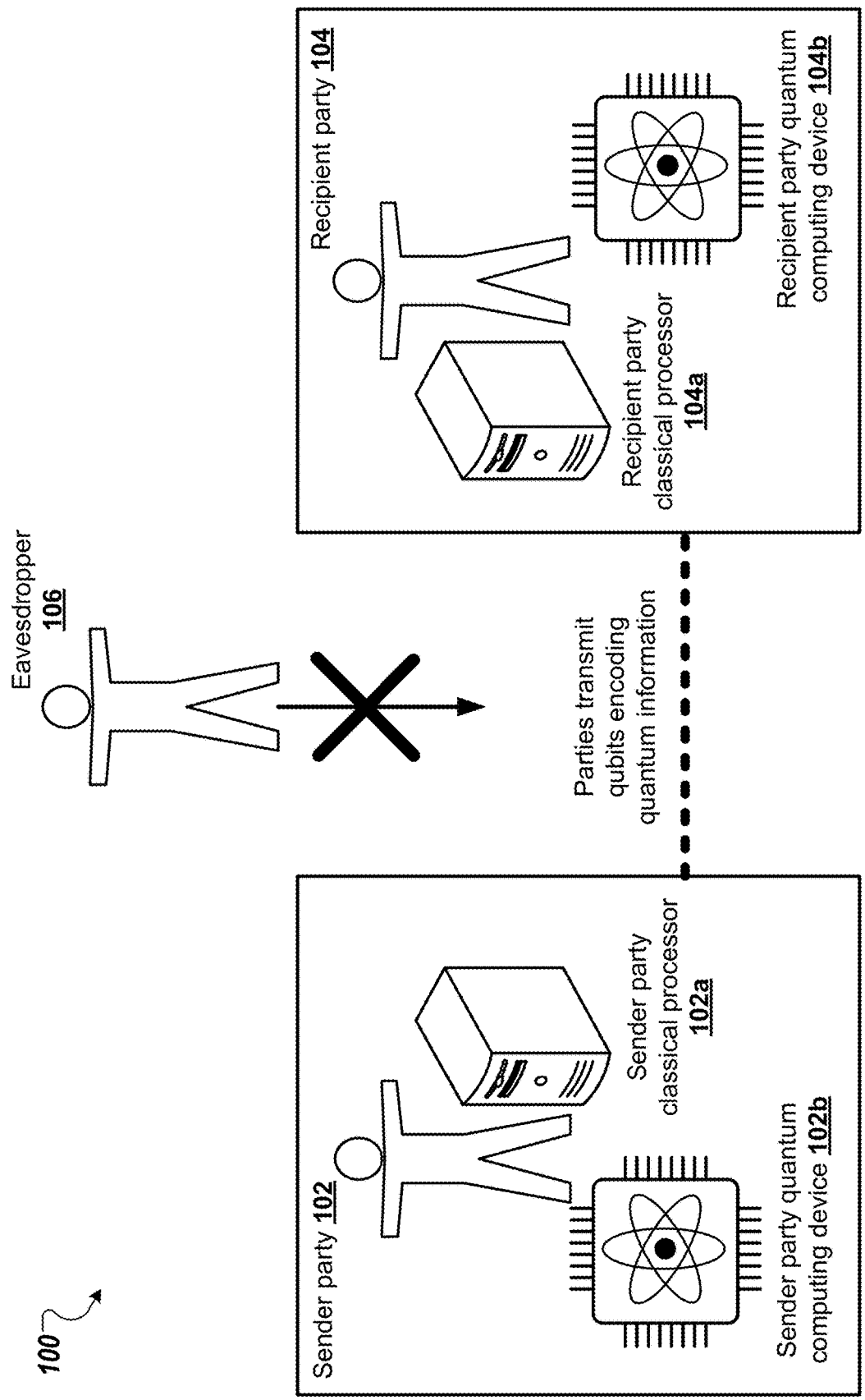
FIG. 1A shows a conceptual block diagram of an example system for sending protected qubits that encode quantum information.

FIG. 1A shows a conceptual block diagram of an example system 100 for sending protected qubits that encode quantum information. The example system 100 includes a sender party 102 and a recipient party 104. The sender party 102 includes a sender party classical processor 102a and a sender party quantum computing device 102b. The sender party classical processor 102a and sender party quantum computing device 102b can exchange electronic communications over one or more networks, or can exchange communications in another way, such as over one or more wired or wireless connections.

The sender party classical processor 102a is configured to perform classical computations. The sender party quantum computing device 102b is configured to perform quantum computations. For convenience, the sender party classical processor 102a and sender party quantum computing device 102b are illustrated as separate entities. However, in some implementations the classical processor 102a can be included in the quantum computing device 102b. That is, the quantum computing device 102b can include components for performing classical computing operations. Generally, the classical computing components of the sender party 102 can be implemented as one or more classical computers having physical hardware like that described with respect to FIG. 15 and the quantum computing components of the sender party 102 can be implemented as quantum computing devices having physical hardware like that described with respect to FIG. 14.

The recipient party 104 includes a recipient party classical processor 104a and a recipient party quantum computing device 104b. The recipient party classical processor 104a and recipient party quantum computing device 104b can exchange electronic communications over one or more networks, or can exchange communications in another way, such as over one or more wired or wireless connections.

The recipient party classical processor 104a is configured to perform classical computations. The recipient party quantum computing device 104b is configured to perform quantum computations. For convenience, the recipient party classical processor 104a and recipient party quantum computing device 104b are illustrated as separate entities. However, in some implementations the classical processor 104a can be included in the quantum computing device 104b. That is, the quantum computing device 104b can include components for performing classical computing operations. Generally, the classical computing components of the recipient party 104 can be implemented as one or more classical computers having physical hardware like that described with respect to FIG. 15 and the quantum computing components of the recipient party 104 can be implemented as quantum computing devices having physical hardware like that described with respect to FIG. 14.

The sender party 102 is configured to encode quantum information in one or more qubits, encrypt the one or more qubits and transmit the encrypted one or more qubits to the recipient party 104. To encrypt the one or more qubits, the sender party 102 performs a quantum encryption technique that includes applying error control operations—a phase operation and parity operation—to the one or more qubits encoding quantum information and to two or more auxiliary qubits. The quantum encryption technique further includes application of a secret sequence of one or more quantum logic gate operations to one or more auxiliary qubits. The quantum encryption technique causes the quantum information to remain confidential until the technique's operations are reversed by the recipient party 104 and enables the recipient party 104 to determine whether an error or tampering occurred during transmission of the qubits. For example, application of the secret sequence of quantum logic gates maintains confidentiality against an eavesdropper 106 during transmission, e.g., against man-in-the-middle attacks, or more generally against any party at any time, provided the party is not privy to the secret sequence of quantum logic gates. Example operations performed by the sender party 102, including example error control operations and secret sequences of quantum logic gates, are described below with reference to FIGS. 3 to 10.

The recipient party 104 is configured to receive encrypted qubits from the sender party 102. In some implementations the recipient party 104 can also receive data identifying secret sequences of quantum logic gates, e.g., sent by the sender party 102, and use the received encrypted qubits and data to decrypt the qubits and obtain the quantum information encoded in the encrypted qubits. In other implementations the recipient party 104 can also receive data identifying quantum computations to perform on the encrypted qubits and perform the quantum computations, e.g., using the recipient party's own quantum algorithms, on the received encrypted qubits without decrypting the qubits. The recipient party 104 can then return the encrypted qubits to the sender party 102 after performing the quantum computations. Example operations performed by the recipient party 104 are described below with reference to FIGS. 3 to 10.

Figure 1B:
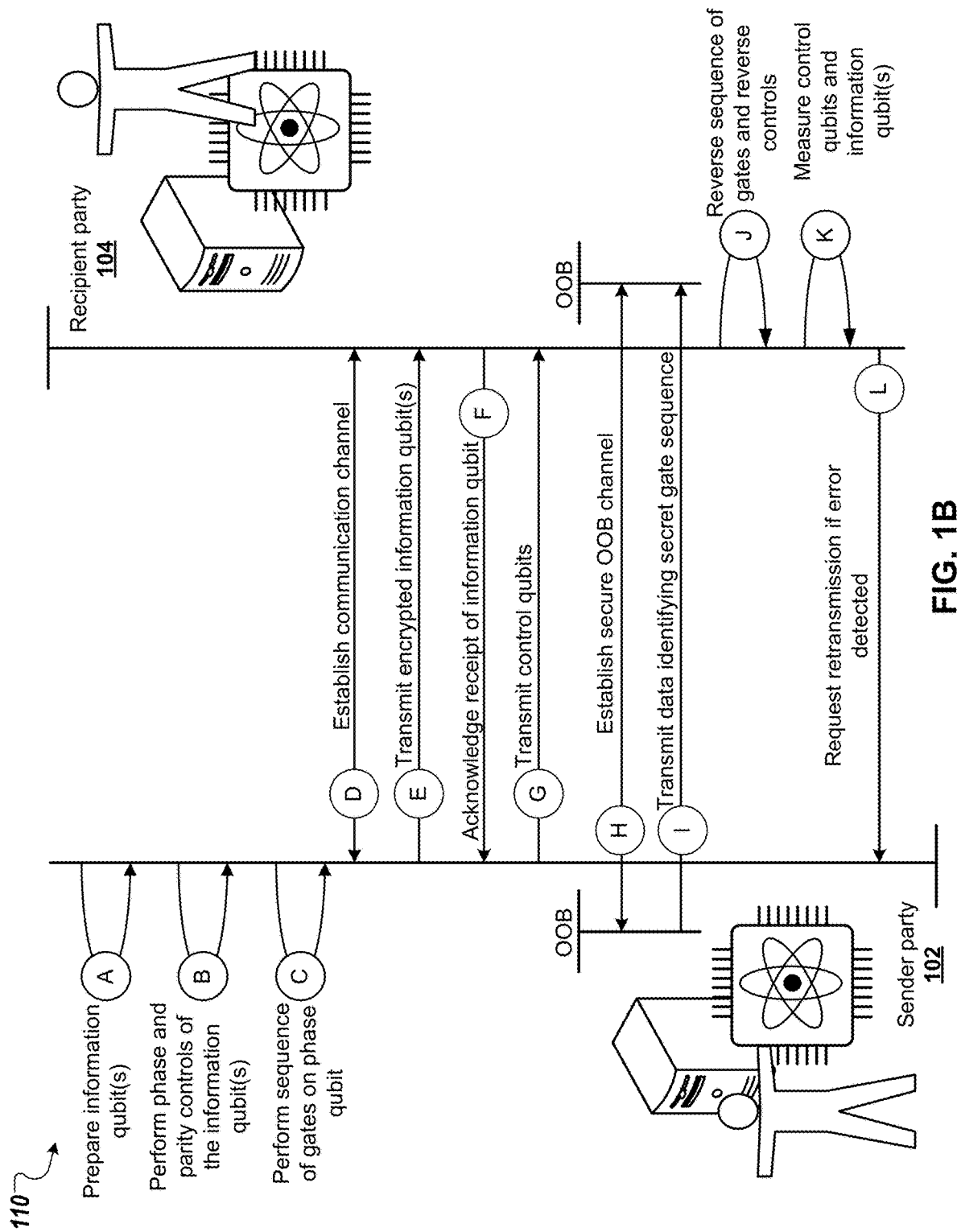
FIG. 1B shows a conceptual block diagram of an example process for sending protected qubits that encode quantum information to a recipient party.

FIG. 1B shows a conceptual block diagram 110 of an example process for sending a protected qubit that encodes quantum information to a recipient party. For convenience, example process 110 describes sending a single qubit that encodes quantum information to a recipient party, however the example process 110 can also be used to send an entangled pair of qubits to a recipient party, as described in more detail below with reference to FIGS. 5 and 7. In addition, various stages of example process 110 can be repeated or adjusted to enable a packet of multiple protected qubits to be sent to a recipient party, as described in more detail below with reference to FIG. 7.

During stage (A) of the example process 110, the sender party 102 prepares the information qubit. Preparing the information qubit includes encoding quantum information into the information qubit.

During stage (B) of the example process 110, the sender party 102 encrypts the prepared information qubit. To encrypt the prepared information qubit, the sender party 102 performs a parity operation and a phase operation on the information qubit and two auxiliary qubits via application of a quantum circuit (or application of a portion of a quantum circuit). In some implementations the parity operation can include a bit flip operation. In these implementations the quantum circuit can include a CNOT gate (also called a Pauli-X gate) that operates on the information qubit and the parity control qubit. In some implementations the phase operation can include a sign flip operation. In these implementations the quantum circuit can include a Hadamard gate on the phase control qubit and a CNOT quantum logic gate that targets the information qubit and uses the phase control qubit as a control. An example quantum circuit that encrypts an information qubit is described below with reference to FIGS. 3A-D.

During stage (C) of the example process 110, the sender party 102 performs a secret sequence of quantum logic gates on the phase control qubit. For example, the sender party 102 can include the secret sequence of quantum logic gates in the quantum circuit used to encrypt the prepared information qubit during stage (B). At stage (C) of the example process 110, the secret sequence of quantum logic gates is known only to the sender party 102 and not known by the recipient party 104. For example, the sender party 102 may generate a new sequence of quantum logic gates each time example process 110 is performed or for each information qubit that is to be sent to the recipient party 104. An example secret sequence of quantum logic gates is described below with reference to FIGS. 3A-D. Example properties of the secret sequence of quantum logic gates are described in detail below with reference to FIG. 7.

During stage (D) of the example process 110, the sender party establishes a quantum communication channel with the recipient party 104. During stage (E) of the example process 110, the sender party 102 transmits the encrypted information qubit to the recipient party 104 using the established quantum communication channel. The quantum communication channel can include any channel configured to quantum matter. For example, the quantum communication channel may be a fiber optic network or free-space network configured to transmit photon-based qubits. As another example, the quantum communication channel can be part of a quantum internet that connects quantum computers to each other, optionally including quantum repeaters, e.g., diamond nitrogen vacancy centers, to transmit quantum information/qubits between the quantum computers. As another example, the quantum communication channel can include a channel configured to physically transport trapped ion qubits in portable suspension devices, or interconnected super cooled nanowires configured to transport *Majorana* qubits.

During stage (F) of the example process 110, the recipient party 104 confirms that they have received the encrypted information qubit by sending the sender party 102 an acknowledgement of receipt of the information qubit.

During stage (G) of the example process 110, the sender party 102 verifies the acknowledgement of receipt and transmits the phase control qubit and the parity control qubit to the recipient party 104 using the established quantum communication channel.

During stage (H) of the example process 110, the sender party 102 establishes a secure Out-of-Band channel with the recipient party 104. During stage (I) of the example process 110, the sender party sends data identifying the secret sequence of quantum logic gates used during stage (C) of the example process 110.

During stage (J) of the example process 110, the recipient party 104 performs a reverse of the secret sequence of quantum logic gates on the received phase control qubit and performs a reverse of the phase operation and parity operation on the information qubit, phase control qubit and parity control qubit. An example quantum circuit for reversing a secret sequence of quantum logic gates, parity operation and phase operation is described below with reference to FIGS. 4A-D.

During stage (K) of the example process 110, the recipient party 104 measures the phase control qubit and the parity control qubit to determine whether the control qubits are both in an "off" state, i.e., a state that indicates no tampering occurred during transmission. If the recipient party 104 determines that the control qubits are not both in an off state, during stage (L) of the example process 110, the recipient party 104 can send a request for retransmission to the sender party 102. If the recipient party 104 determines that the control qubits are both in an off state, the recipient party 104 measures the information qubit to obtain the quantum information encoded in the information qubit during stage (A). Alternatively, the recipient party 104 may perform additional operations and delayed measurement of the information qubit.

Figure 1C:
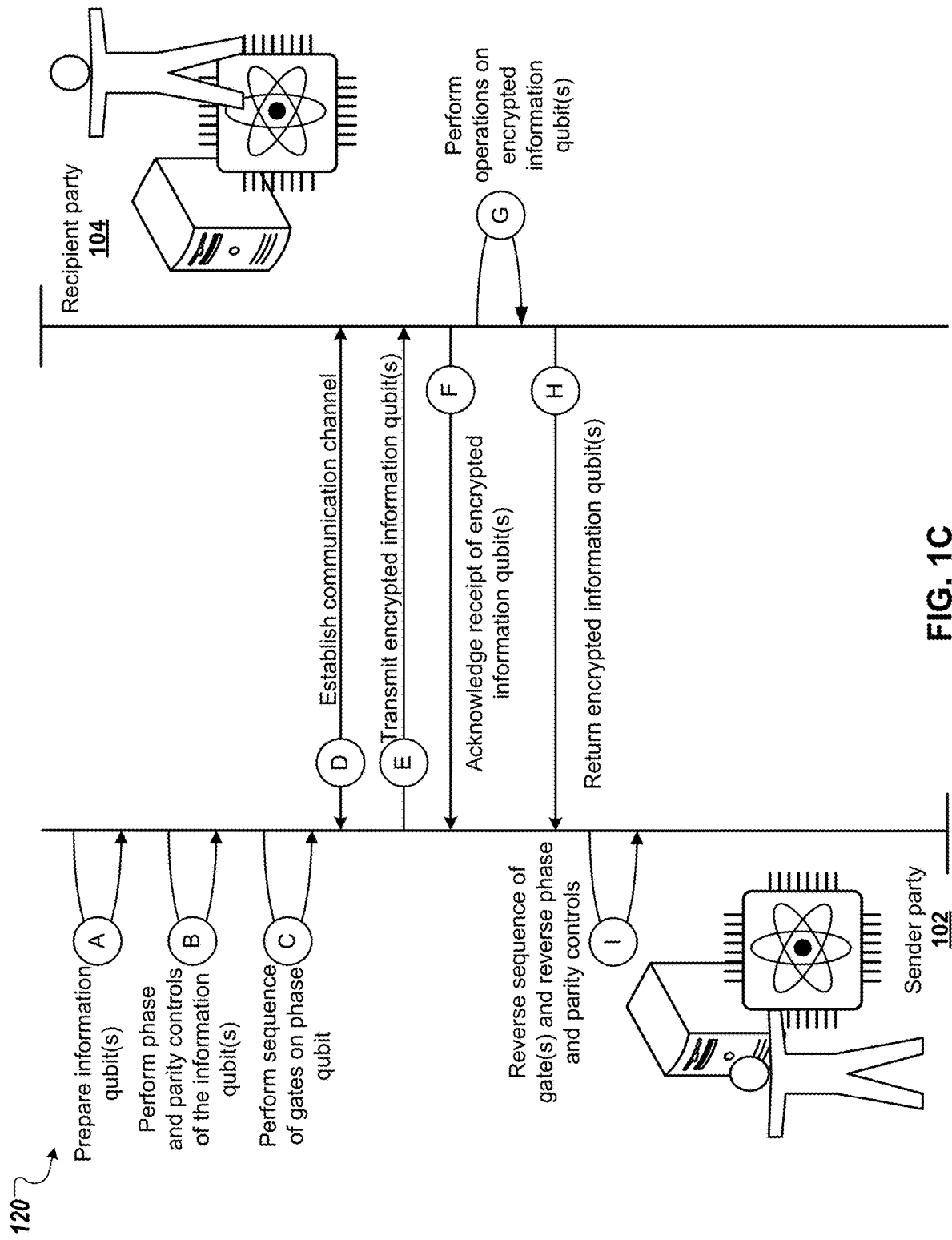
FIG. 1C shows a conceptual block diagram of an example process for utilizing a third party to perform quantum algorithms on protected qubits without revealing quantum information encoded by the protected qubits.

FIG. 1C shows a conceptual block diagram 120 of an example process for utilizing a third party to perform quantum computations on protected qubits without revealing quantum information encoded by the protected qubits. For convenience, example process 120 describes utilizing a third party to perform quantum computations on a single qubit that encodes quantum information, however the example process 120 can also be used to utilize a third party to perform quantum computations on an entangled pair of qubits, as described in more detail below with reference to FIGS. 5 and 9. In addition, various stages of example process 120 can be repeated or adjusted to enable a packet of multiple protected qubits to be sent and operated on by a recipient party, as described in more detail below with reference to FIG. 9.

During stage (A) of the example process 120, the sender party 102 prepares the information qubit. Stage (A) of example process 120 is similar to stage (A) of example process 110 and therefore, for brevity, further details are not repeated.

During stage (B) of the example process 120, the sender party 102 encrypts the prepared information qubit. Stage (B) of the example process 120 is similar to stage (B) of example process 110 and therefore, for brevity, further details are not repeated.

During stage (C) of the example process 120, the sender party 102 performs a secret sequence of quantum logic gates on the phase control qubit. Stage (C) of the example process 120 is similar to stage (C) of example process 110 and therefore, for brevity, further details are not repeated.

During stage (D) of the example process 120, the sender party establishes a quantum communication channel with the recipient party 104. During stage (E) of the example process 120, the sender party 102 transmits the encrypted information qubit to the recipient party 104 using the established quantum communication channel. Stages (D) and (E) of the example process 120 are similar to stages (D) and (E) of example process 110 and therefore, for brevity, further details are not repeated.

During stage (F) of the example process 120, the recipient party 104 confirms that they have received the encrypted information qubit by sending the sender party 102 an acknowledgement of receipt of the information qubit.

During stage (G) of the example process 120, the recipient party 104 performs quantum computations on the received encrypted information qubit. For example, the sender party 102 may transmit data identifying a particular quantum computation to perform on the received information qubits during stage (E) of the example process, or at any time prior to stage (G). The recipient party 104 can then apply a quantum algorithm to the information qubit to perform the quantum computation. In some cases the quantum algorithm may be specified by the sender party 102. In other cases the recipient party 104 can implement their own quantum algorithm to perform the quantum computation without disclosing the details of their algorithm to the sender party.

For example, in some cases the sender party 102 may have access to a small scale quantum computer, e.g., a quantum computer that can operate and store a relatively small, fixed number of qubits and/or can perform a limited number of operations on the qubits. Therefore, the sender party 102 may not be able to perform costly quantum computations, e.g., quantum computations that require the preparation and operation of auxiliary qubits, quantum computations that require application of T-gates (which in turn may require costly magic state distillation procedures) and/or fault tolerant quantum computations based on quantum error correction codes. The sender party 102 may therefore outsource these quantum computations to an external party, e.g., the recipient party 104, that has access to a larger scale quantum computer.

However, the information encoded by the sender party's qubits may be confidential, and whilst the sender party 102 needs to outsource quantum computations to the recipient party 104, the sender party 102 may not want the recipient party 104 to have access to this information. For example, the sender party 102 may have experienced a ransomware attack or lost the decryption key to an RSA encrypted database. In this setting the sender party 102 may need to perform prime factorization to recover their data, and may request that the recipient party 104 perform a Shor algorithm. However, the sender party would not want to disclose information related to their private key to the recipient party performing Shor's algorithm for them. As another example, the sender party 102 may encode protected health data into qubits (or generate them with quantum metrology, e.g., a quantum MM). The sender party 102 can then encrypt these qubits and ask a recipient party 104 who has proprietary quantum machine learning disease classifying algorithms to run their algorithms on the encrypted qubits to identify the presence of disease—without disclosing any identifying information or protected patient health information to the recipient party.

As another example, the sender party 102 and recipient party 104 may perform example process 120 as party of a zero-knowledge protocol, where one party asks another a series of questions, and the answer is one qubit each time.

During stage (H) of the example process 120, the recipient party 104 returns the encrypted information qubit to the recipient party 104 using the established quantum communication channel.

During stage (I) of the example process 120, the sender party 102 performs a reverse of the secret sequence of quantum logic gates on the phase control qubit and performs a reverse of the phase operation and parity operation on the information qubit, phase control qubit and parity control qubit. An example quantum circuit for reversing a secret sequence of quantum logic gates, parity operation and phase operation is described below with reference to FIGS. 4A-D. The sender party 102 can then perform additional operations on the information qubit to additional computations, or can measure the information qubit to obtain a result of the quantum computations performed by the recipient party 104 during stage (G).

Figure 2A:
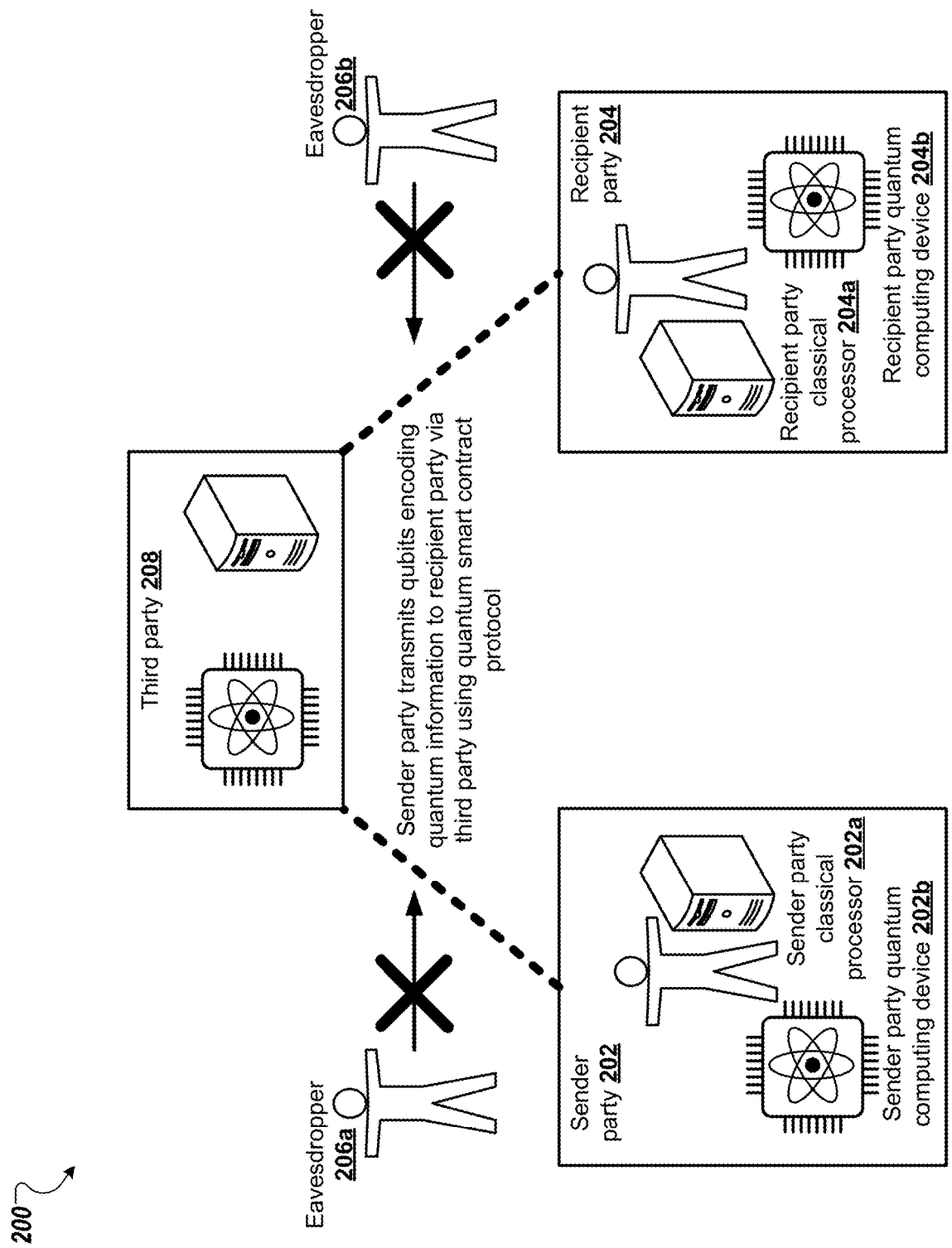
FIG. 2A shows a conceptual block diagram of an example system for implementing a quantum smart contract.

FIG. 2A shows a conceptual block diagram of an example system 200 for implementing a quantum smart contract. The example system 200 includes a sender party 202, a recipient party 204 and a third party 208.

The sender party 202 of FIG. 2A is similar to the sender party 102 described above with reference to FIG. 1A. That is, the sender party 202 includes a sender party classical processor 202a and a sender party quantum computing device 202b. The sender party classical processor 202a and sender party quantum computing device 202b can exchange electronic communications over one or more networks, or can exchange communications in another way, such as over one or more wired or wireless connections. The sender party classical processor 202a is configured to perform classical computations. The sender party quantum computing device 202b is configured to perform quantum computations. For convenience, the sender party classical processor 102a and sender party quantum computing device 202b are illustrated as separate entities. However, in some implementations the classical processor 202a can be included in the quantum computing device 202b. Generally, the classical computing components of the sender party 202 can be implemented as one or more classical computers having physical hardware like that described with respect to FIG. 15 and the quantum computing components of the sender party 202 can be implemented as quantum computing devices having physical hardware like that described with respect to FIG. 14.

The recipient party 204 of FIG. 2A is similar to the recipient party 104 described above with reference to FIG. 1A. That is, the recipient party 204 includes a recipient party classical processor 204a and a recipient party quantum computing device 204b. The recipient party classical processor 204a and recipient party quantum computing device 204b can exchange electronic communications over one or more networks, or can exchange communications in another way, such as over one or more wired or wireless connections. The recipient party classical processor 104a is configured to perform classical computations. The recipient party quantum computing device 204b is configured to perform quantum computations. For convenience, the recipient party classical processor 204a and recipient party quantum computing device 204b are illustrated as separate entities. However, in some implementations the classical processor 204a can be included in the quantum computing device 204b. Generally, the classical computing components of the recipient party 204 can be implemented as one or more classical computers having physical hardware like that described with respect to FIG. 15 and the quantum computing components of the recipient party 204 can be implemented as quantum computing devices having physical hardware like that described with respect to FIG. 14.

The third party 208 includes a classical processor and a quantum computing device. The classical processor and quantum computing device can exchange electronic communications over one or more networks, or can exchange communications in another way, such as over one or more wired or wireless connections. The classical processor is configured to perform classical computations. The quantum computing device is configured to perform quantum computations. For convenience, the classical processor and quantum computing device are illustrated as separate entities. However, in some implementations the classical processor can be included in the quantum computing device. Generally, the classical computing components of the third party 208 can be implemented as one or more classical computers having physical hardware like that described with respect to FIG. 15 and the quantum computing components of the third party 208 can be implemented as quantum computing devices having physical hardware like that described with respect to FIG. 14.

The sender party 202 is configured to encode quantum information in one or more qubits, encrypt the one or more qubits and transmit the encrypted one or more qubits to the recipient party 104 via the third party 208. To encrypt the one or more qubits, the sender party 102 performs the encryption technique described above with reference to FIG. 1A. As described above, application of the encryption technique maintains confidentiality against an eavesdropper 206 during transmission. Example operations performed by the sender party 202 are described below with reference to FIGS. 3A, 3B, 4A-4D and 11.

The third party 208 is configured to mediate between the sender party 202 and 204. For example, the third party 208 is configured to hold qubits received from the sender party 202 in escrow, and to release the qubits to the recipient party 204 in response to determining that terms and conditions of a contract between the sender party 202 and the recipient party 204 have been met. Example operations performed by the third party 208 are described below with reference to FIG. 13.

The recipient party 204 is configured to receive encrypted information qubits from the third party 208 and parity or phase control qubits from the sender party 202. The recipient party 204 can also receive data identifying secret sequences of quantum logic gates, e.g., sent by the sender party 202 either directly or via the third party 208, and use the received encrypted qubits and data to decrypt the qubits and obtain the quantum information encoded in the encrypted qubits. Example operations performed by the recipient party 104 are described below with reference to FIGS. 3A, 3B, 4A-4D and 12.

Figure 2B:
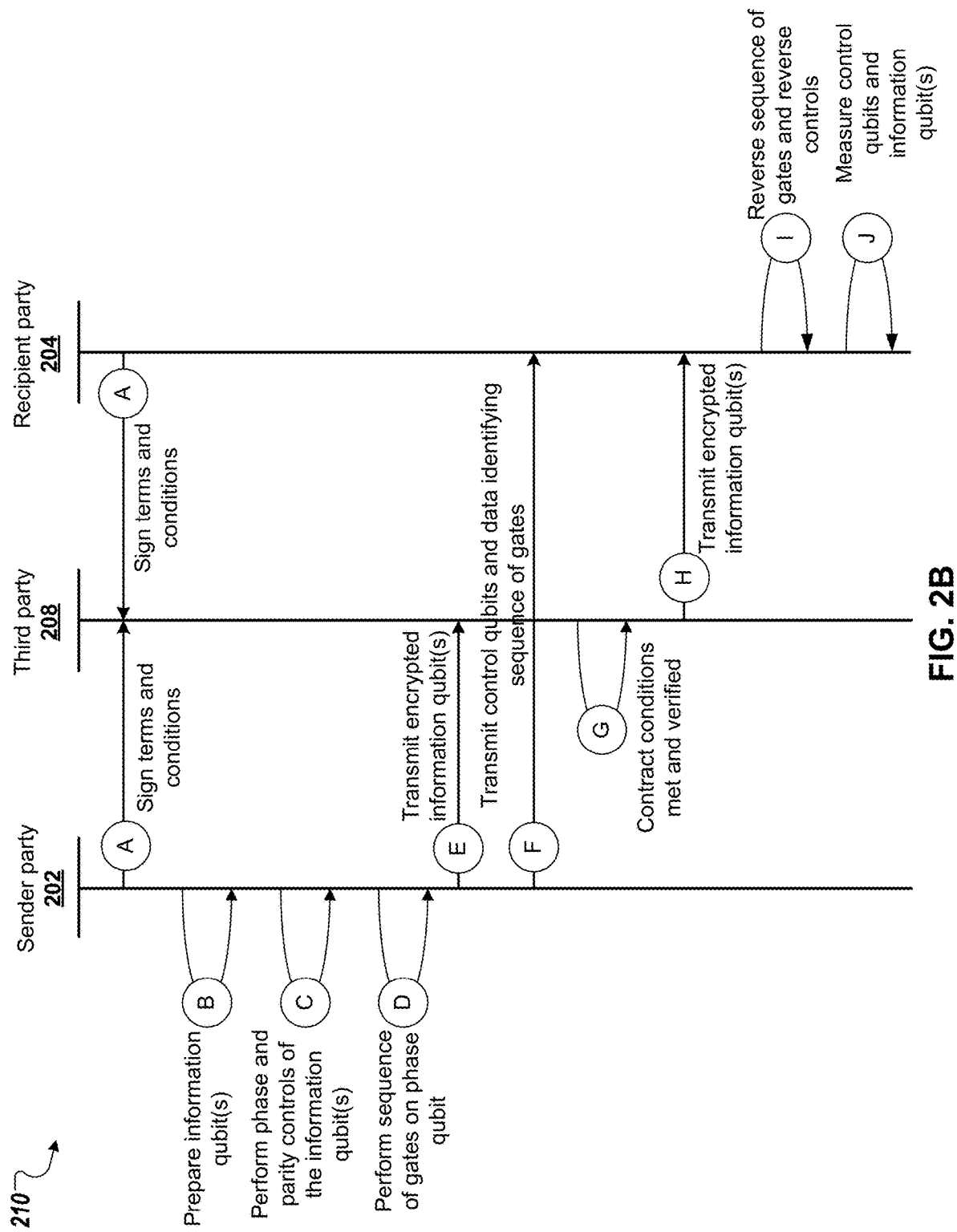
FIG. 2B shows a conceptual block diagram of an example process for sending protected qubits that encode quantum information to a recipient party using a quantum smart contract.

FIG. 2B shows a conceptual block diagram of an example process 210 for sending protected qubits that encode quantum information to a recipient party using a quantum smart contract. For convenience, example process 210 describes sending a single qubit that encodes quantum information to a recipient party using a quantum smart contract, however the example process 210 can also be used to send an entangled pair of qubits to a recipient party using a quantum smart contract, as described in more detail below with reference to FIGS. 5 and 11. In addition, various stages of example process 210 can be repeated or adjusted to enable a packet of multiple protected qubits to be sent to a recipient party using a quantum smart contract, as described in more detail below with reference to FIG. 11.

During stage (A) of the example process 210, the sender party 202 and recipient party 204 sign terms and conditions of the smart contract, and send the signed terms and conditions to the third party 208.

During stage (B) of the example process 210, the sender party 102 prepares the information qubit. Stage (B) of example process 210 is similar to stage (A) of example process 110 of FIG. 1B and therefore, for brevity, further details are not repeated.

During stage (C) of the example process 210, the sender party 202 encrypts the prepared information qubit. Stage (C) of the example process 210 is similar to stage (B) of example process 110 and therefore, for brevity, further details are not repeated.

During stage (D) of the example process 210, the sender party 202 performs a secret sequence of quantum logic gates on the phase control qubit. Stage (D) of the example process 210 is similar to stage (C) of example process 110 and therefore, for brevity, further details are not repeated.

During stage (E) of the example process 210, the sender party 202 transmits the encrypted information qubit to the third party 208, e.g., using a quantum communication channel as described above with reference to stage (D) of example process 110.

During stage (F) of the example process 210, the sender party 202 transmits the phase control qubit and the parity control qubit to the recipient party 204, e.g., using a quantum communication channel. The sender party 202 also sends data identifying the secret sequence of quantum logic gates used during stage (D) of the example process 210, e.g., using an Out-of-Band channel as described above with reference to stages (H) and (I) of example process 110.

During stage (G) of the example process 210, the third party 208 determines whether the terms and conditions of the contract have been met. In response to determining that the terms and conditions have been met, during stage (H), the third party 208 transmits the encrypted information qubit to the recipient party 204, e.g., using a quantum communication channel In response to determining that the terms and conditions have not been mat, the third party 208 can notify the sender party 202 and/or the recipient party 204.

During stage (I) of the example process 210, the the recipient party 204 performs a reverse of the secret sequence of quantum logic gates on the phase control qubit and performs a reverse of the phase operation and parity operation on the information qubit, phase control qubit and parity control qubit. An example quantum circuit for reversing a secret sequence of quantum logic gates, parity operation and phase operation is described below with reference to FIGS. 4A-D.

During stage (J) of the example process 210, the recipient party 204 measures the phase control qubit and the parity control qubit to determine whether the control qubits are both in an "off" state, i.e., a state that indicates no tampering occurred during transmission. If the recipient party 204 determines that the control qubits are not both in an off state, the recipient party 204 can send a request for retransmission to the sender party 202 or to the third party 208. If the recipient party 204 determines that the control qubits are both in an off state, the recipient party 204 measures the information qubit to obtain the quantum information encoded in the information qubit during stage (B). Alternatively, the recipient party 204 may perform additional operations and delayed measurement of the information qubit.

Figure 3A:
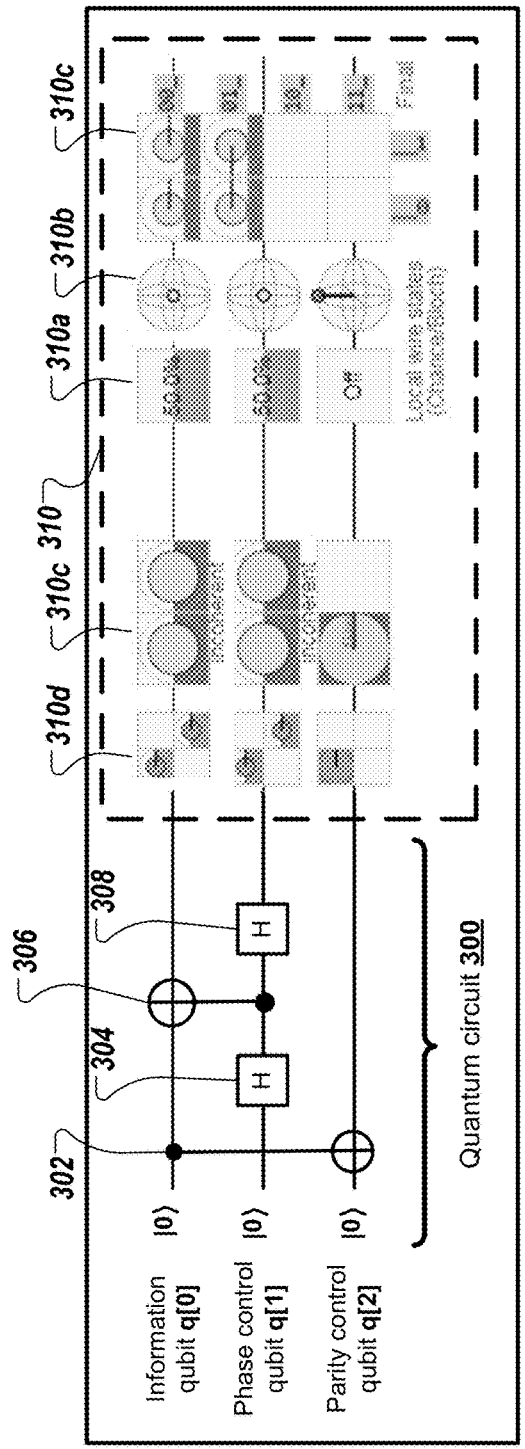
FIGS. 3A and 3B show example quantum circuits for encrypting an information qubit.
Figure 3B:
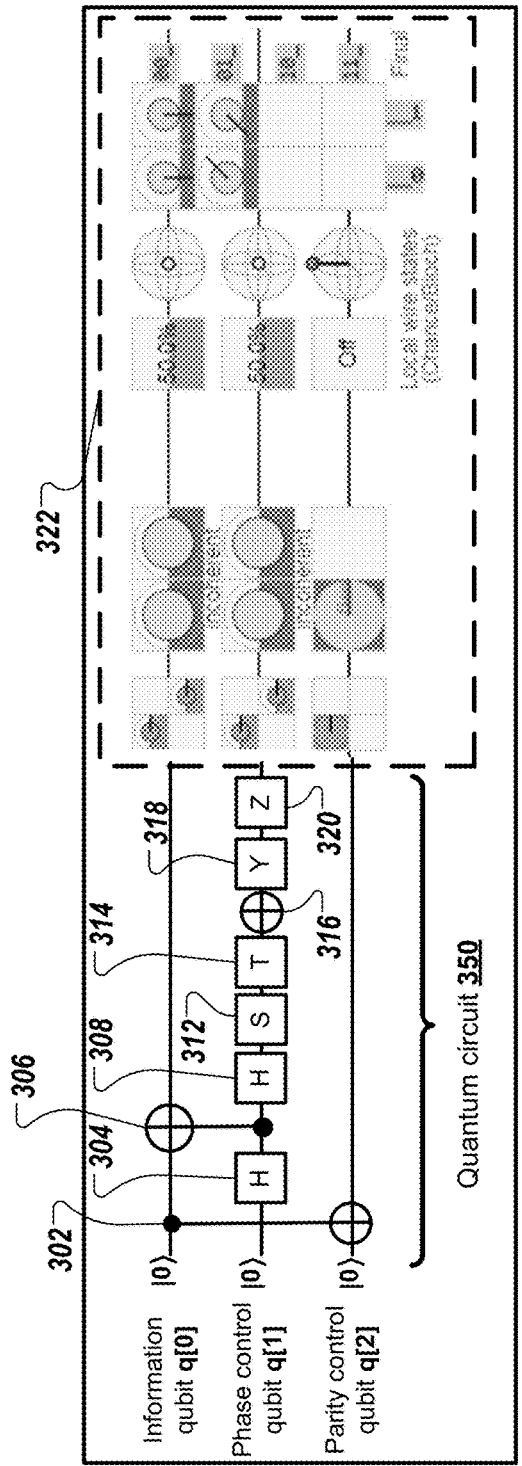

FIGS. 3A and 3B show example quantum circuits for encrypting an information qubit. For example, the example quantum circuits or variations thereof can be used to perform stages (B) and (C) of example process 110, stages (B) and (C) of example process 120, or stages (C) and (D) of example process 210 as described above with reference to FIGS. 1B, 1C and 2B, respectively.

FIG. 3A shows an example quantum circuit 300. The example quantum circuit 300 operates on a register of three qubits q[0], q[1] and q[2]. The first qubit q[0] is an information qubit that encodes quantum information. In this example, the first qubit is in a zero state 10). However, the state of the first qubit is dependent on the quantum information that it encodes. The second qubit q[1] is a phase control qubit and the third qubit q[2] is a parity control qubit. In this example both the phase control qubit and parity control qubit are prepared in a zero state 10). However, the parity control qubit and phase control qubit can also be prepared in other initial states, as described below with reference to FIG. 7.

The example quantum circuit 300 includes a first CNOT gate 302 that targets the parity control qubit q[2] and uses the information qubit q[0] as a control. Application of the first CNOT gate 302 implements the above described parity operation, e.g., bit flip operation. The example quantum circuit 300 further includes a first Hadamard gate 304 that is applied to the phase control qubit q[1] and a second CNOT gate 306 that targets the information qubit q[0] and uses the phase control qubit q[1] as a control. Application of the Hadamard gate 304 and CNOT gate 306 implement the above described phase operation, e.g., sign flip operation.

The example quantum circuit 300 further includes a Hadamard gate that is applied to the phase control qubit q[1]. The Hadamard gate 308 represents the secret sequence of quantum logic gates described above with reference to stage (C) of example process 200. That is, in this example, the secret sequence of quantum logic gates includes one single-qubit gate. However, this is a non-limiting example and generally the sequence could include more quantum logic gates. Additional properties of the sequence of quantum logic gates applied to the phase control qubit are described below with reference to FIG. 7.

The box 310 on the right of the example quantum circuit 300 illustrate example statistical properties of the states of the qubits q[0], q[1], and q[2] after the example quantum circuit 300 has been applied. The statistical properties have been calculated using the Quirk quantum circuit simulator. The box 310 (and similar boxes in other circuit diagrams included in the present disclosure) shows a chance display 310a, Bloch sphere display 310b, amplitude display 310c, and density matrix display. The chance display 310a shows that, if the information qubit were to be measured (in this example in the computational eigenbasis) at this point, e.g., by an eavesdropper during transmission, there is a 50% chance that the measurement would output an eigenvalue corresponding to the zero state and a 50% chance that the measurement would output an eigenvalue corresponding to the one state. That is, an eavesdropper could not infer the quantum information encoded in the information qubit prior to application of the quantum circuit 300. The Bloch sphere display 310b shows a Bloch vector representation of the qubits' states. The amplitude displays 310c is similar to the chance display, but shows the quantum amplitude of each computation basis state of the qubits covered by the display instead of probabilities. The density matrix display 310d is similar to the amplitude displays 310c, but shows components of the density matrix of covered qubits instead of the components of the superposition.

FIG. 3B shows an example quantum circuit 350. Similarly to example quantum circuit 300 of FIG. 3A, the example quantum circuit 350 operates on an information qubit q[0] that encodes quantum information, a phase control qubit q[1] and a parity control qubit q[2]. The example quantum circuit 350 also includes the quantum logic gates 302-306 described above with reference to FIG. 3A. That is, the example quantum circuit 350 includes quantum logic gates for implementing a parity operation and a phase operation.

The example quantum circuit 350 further includes a Hadamard gate 308, S gate 312, T gate 314, NOT gate 316, Pauli-Y gate 318 and Pauli-Z gate 320 that are each applied to the phase control qubit q[1]. The gates 308, 312-320 represent a secret sequence of quantum logic gates as described above with reference to stage (C) of example process 200. That is, in this example, the secret sequence of quantum logic gates includes six single-qubit gates. However, this is also a non-limiting example and generally the sequence could include fewer or more quantum logic gates, and different types of quantum logic gates.

The box 322 on the right of the example quantum circuit 350 illustrates the statistical properties of the states of the qubits q[0], q[1], and q[2] after the example quantum circuit 350 has been applied. For example, box 322 shows that, if the information qubit were to be measured (in this example in the computational eigenbasis) at this point, e.g., by an eavesdropper during transmission, there is a 50% chance that the measurement would output an eigenvalue corresponding to the zero state and a 50% chance that the measurement would output an eigenvalue corresponding to the one state. That is, an eavesdropper could not infer the quantum information encoded in the information qubit prior to application of the quantum circuit 350.

FIGS. 4A-4E show example quantum circuits for encrypting and subsequently decrypting an information qubit.

Figure 4A:
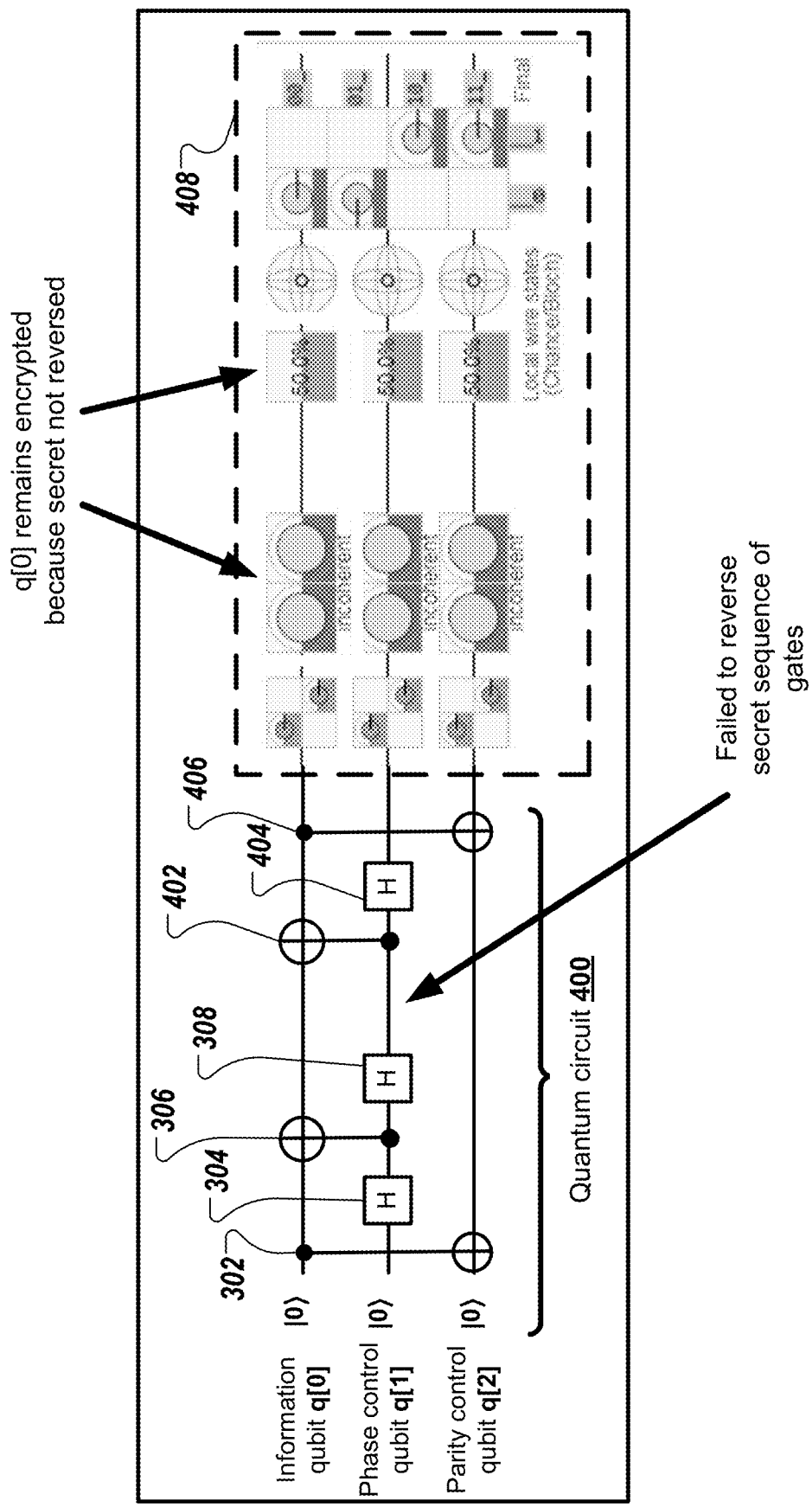
FIGS. 4A-4E show example quantum circuits for decrypting an information qubit.

FIG. 4A shows a first example quantum circuit 400 for decrypting an information qubit that has been encrypted using example quantum circuit 300 of FIG. 3A. Accordingly, the example quantum circuit 400 also operates on an information qubit q[0] that encodes quantum information, a phase control qubit q[1] and a parity control qubit q[2].

The example quantum circuit 400 shows the quantum logic gates 302-308 described above with reference to FIG. 3A that are used to encrypt the information qubit q[0]. The example quantum circuit 400 includes three additional operations—a CNOT operation 402 that targets the information qubit q[0] and uses the phase control qubit q[1] as a control, a Hadamard gate 404 that is applied to the phase control qubit q[1], and a CNOT operation 406 that targets the parity control qubit q[2] and uses the information qubit q[0] as a control.

In example quantum circuit 400, the phase operation and parity operation that correspond to quantum gates 302, 304 and 306 of example quantum circuit 300 of FIG. 3A are reversed. However, the secret sequence of quantum logic gates, in this example Hadamard gate 308, has not been reversed. Accordingly, application of the example quantum circuit 400 does not successfully decrypt the information qubit q[0]. This is illustrated in box 408.

Box 408 illustrates the statistical properties of the states of the qubits q[0], q[1], and q[2] after the example quantum circuit 400 has been applied. For example, box 408 shows that, if the information qubit were to be measured (in this example in the computational eigenbasis) at this point there is a 50% chance that the measurement would output an eigenvalue corresponding to the zero state and a 50% chance that the measurement would output an eigenvalue corresponding to the one state. That is, the information qubit q[0] remains encrypted and an eavesdropper could not infer the quantum information encoded in the information qubit prior to application of the quantum circuit 400.

Figure 4B:
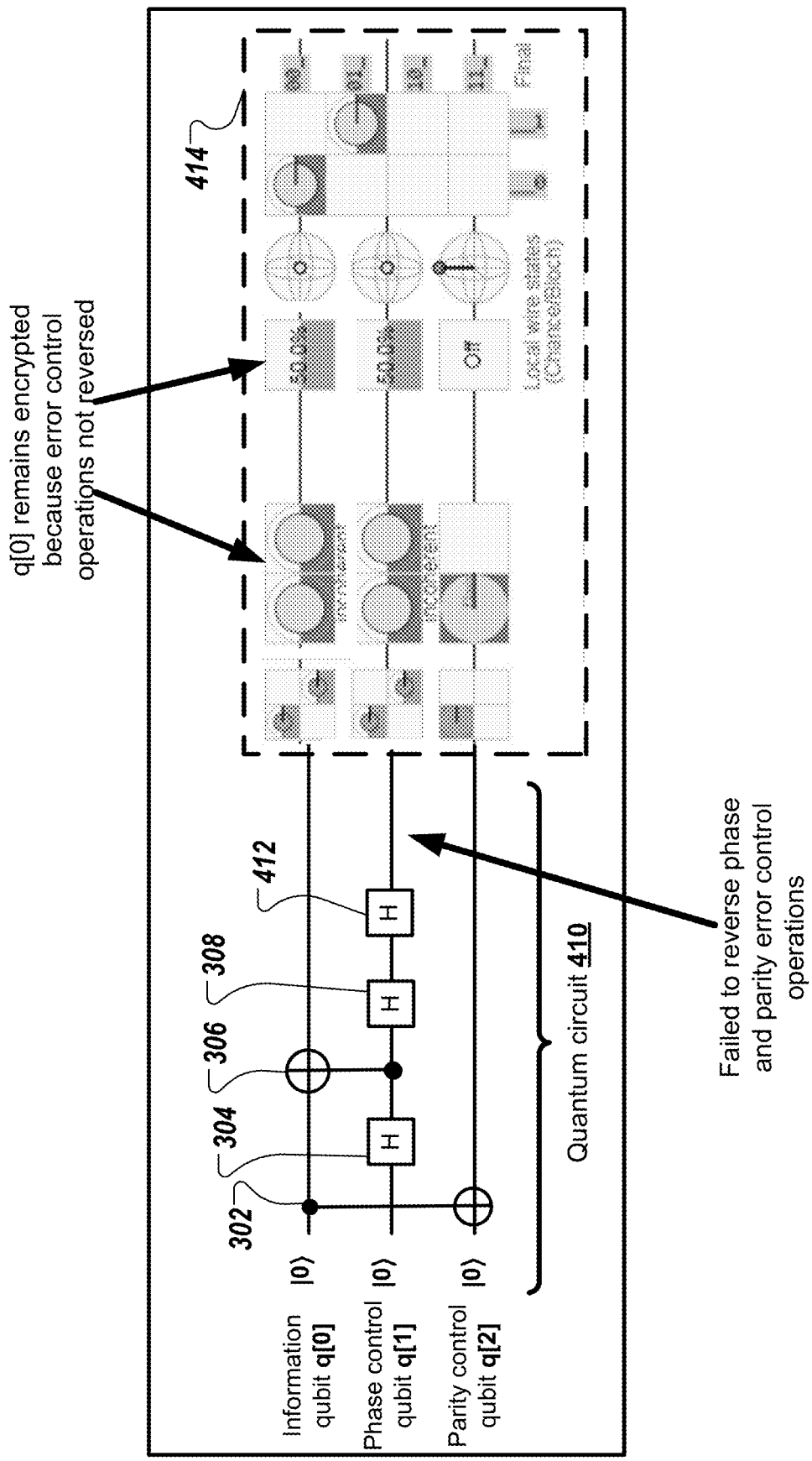

FIG. 4B shows a second example quantum circuit 410 for decrypting an information qubit that has been encrypted using example quantum circuit 300 of FIG. 3A. Accordingly, the example quantum circuit 410 also operates on an information qubit q[0] that encodes quantum information, a phase control qubit q[1] and a parity control qubit q[2]

The example quantum circuit 410 shows the quantum logic gates 302-308 described above with reference to FIG. 3A that are used to encrypt the information qubit q[0]. The example quantum circuit 410 includes one additional operation—a Hadamard gate 412 that is applied to the phase control qubit q[1].

In example quantum circuit 410, the secret sequence of quantum logic gates, in this example Hadamard gate 308, has been reversed. However, the phase operation and parity operation that correspond to quantum gates 302, 304 and 306 of example quantum circuit 300 of FIG. 3A have not been reversed. Accordingly, application of the example quantum circuit 410 does not successfully decrypt the information qubit q[0]. This is illustrated in box 414.

Box 414 illustrates the statistical properties of the states of the qubits q[0], q[1], and q[2] after the example quantum circuit 410 has been applied. For example, box 414 shows that, if the information qubit were to be measured (in this example in the computational eigenbasis) at this point there is a 50% chance that the measurement would output an eigenvalue corresponding to the zero state and a 50% chance that the measurement would output an eigenvalue corresponding to the one state. That is, the information qubit q[0] remains encrypted and an eavesdropper could not infer the quantum information encoded in the information qubit prior to application of the quantum circuit 410.

Figure 4C:
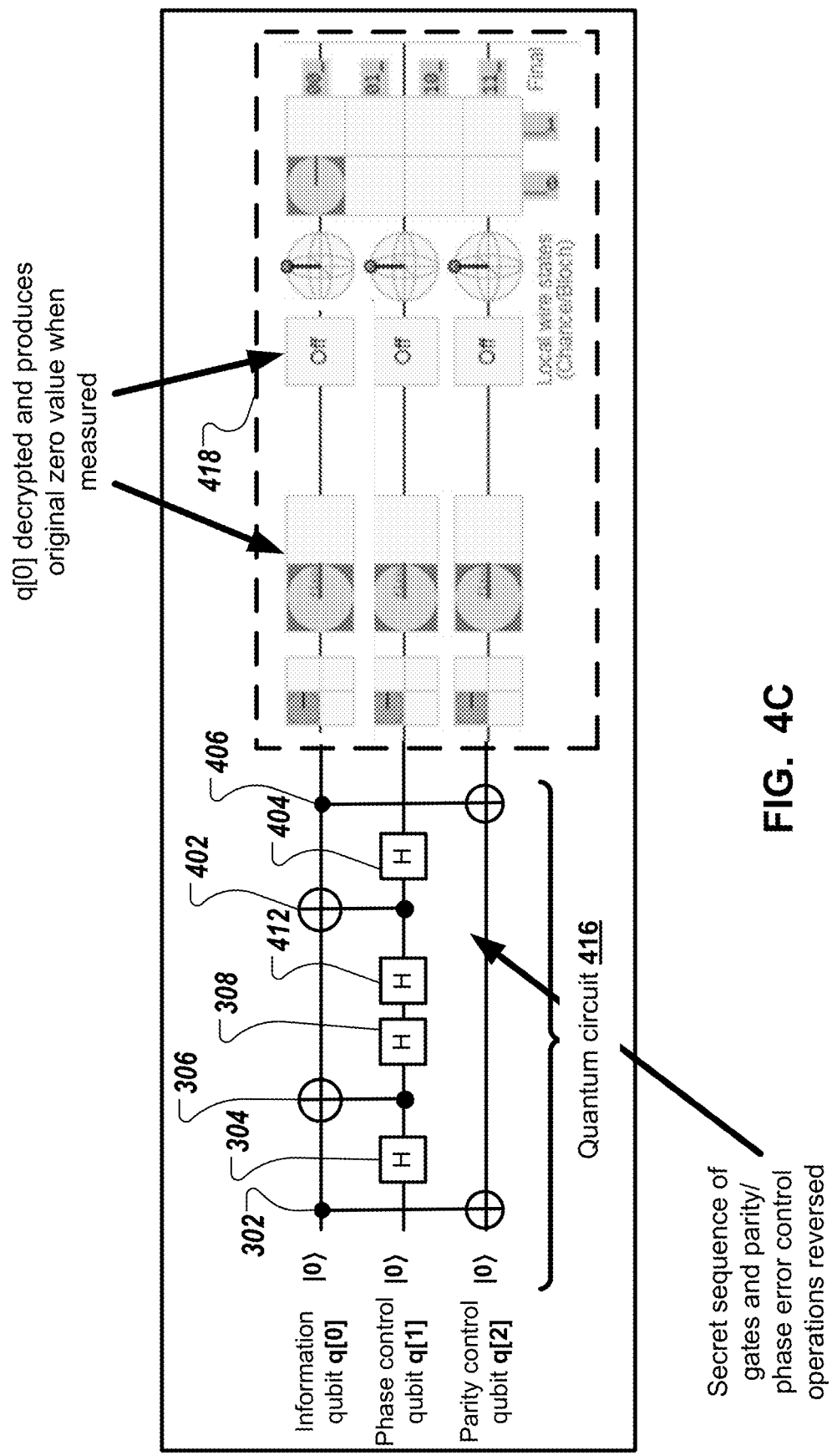

FIG. 4C shows an example quantum circuit 416 for decrypting an information qubit. Example quantum circuit 416 or variations thereof can be used to perform encryption stages (B), (C) and decryption stage (J) of example process 110, encryption stages (B), (C) and decryption stage (I) of example process 120, and encryption stages (C), (D) and decryption stage (I) of example process 210 as described above with reference to FIGS. 1B, 1C and 2B, respectively.

Example quantum circuit 416 can be used to decrypt an information qubit that has been encrypted using example quantum circuit 300 of FIG. 3A. Accordingly, the example quantum circuit 416 also operates on an information qubit q[0] that encodes quantum information, a phase control qubit q[1] and a parity control qubit q[2].

The example quantum circuit 416 shows the quantum logic gates 302-308 described above with reference to FIG. 3A that are used to encrypt the information qubit q[0]. The example quantum circuit 400 includes four additional operations—a Hadamard gate 412 that is applied to the phase control qubit q[1], a CNOT gate 402 that targets the information qubit q[0] and uses the phase control qubit q[1] as a control, a Hadamard gate 404 that is applied to the phase control qubit and a CNOT gate 406 that targets the parity control qubit q[2] and uses the information qubit q[0] as a control.

In the example quantum circuit 416 the secret sequence of quantum logic gates that corresponds to Hadamard gate 308 of example quantum circuit 300 are reversed via application of Hadamard gate 412. In addition, the phase operation and parity operation that correspond to quantum gates 302, 304 and 306 of example quantum circuit 300 of FIG. 3A are reversed via application of CNOT gate 402, Hadamard gate 404 and CNOT gate 406. Accordingly, application of the example quantum circuit 416 successfully decrypts the information qubit q[0]. This is illustrated in box 418.

Box 418 illustrates the statistical properties of the states of the qubits q[0], q[1], and q[2] after the example quantum circuit 416 has been applied. For example, box 418 shows that, if the information qubit were to be measured (in this example in the computational eigenbasis) at this point the measurement would output an eigenvalue corresponding to the zero state. That is, the information qubit q[0] is decrypted and encodes the original value.

Figure 4D:
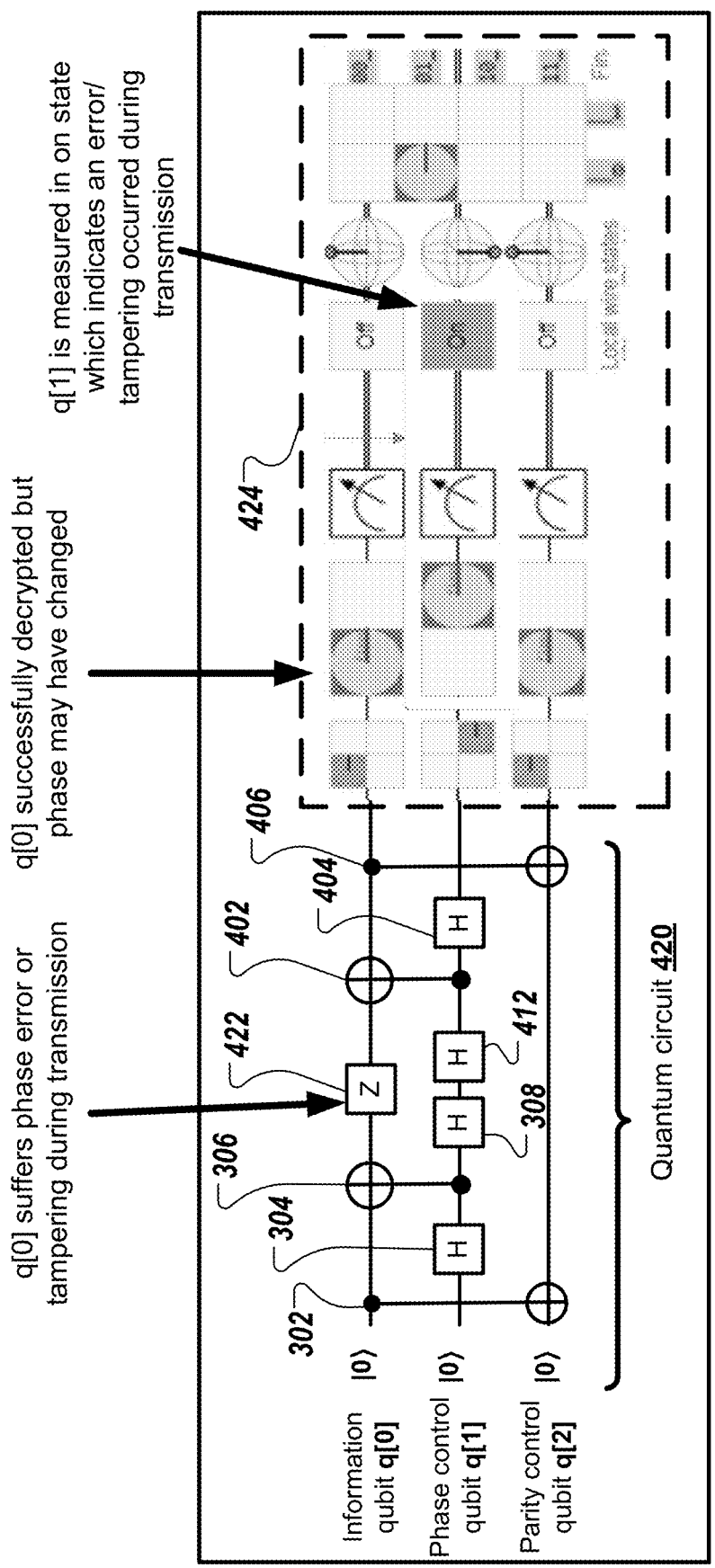

FIG. 4D shows an example quantum circuit 420 for decrypting an information qubit that has been encrypted using example quantum circuit 300 of FIG. 3A. Accordingly, the example quantum circuit 420 also operates on an information qubit q[0] that encodes quantum information, a phase control qubit q[1] and a parity control qubit q[2].

The example quantum circuit 420 shows the quantum logic gates 302-308 described above with reference to FIG. 3A that are used to encrypt the information qubit q[0]. The example quantum circuit 420 also shows the quantum logic gates 412, 402-406 described above with reference to FIG. 4C that are used to successfully decrypt the information qubit q[0]. However, example quantum circuit 420 also includes a Pauli-Z gate 422 that is applied to the information qubit q[0].

Pauli-Z gate 422 can represent an error that could have occurred during transmission from the sender party to the recipient party, or malicious tampering performed by an eavesdropper. The Pauli-Z gate 422 changes the phase of the information qubit q[0]. Therefore, when the information qubit q[0] is measured by the recipient party, the measurement result may indicate a correct output state (in this example the zero state) but the phase may have changed. However, this error can be detected via measurement of the phase control qubit q[1]. This is shown in box 424.

Box 424 illustrates the statistical properties of the states of the qubits q[0], q[1], and q[2] after the example quantum circuit 420 has been applied. For example, box 424 shows that, if the phase control qubit q[1] were to be measured at this point the measurement would output an eigenvalue corresponding to the one state (the "on" state). That is, the phase control qubit q[1] indicates that an error or tampering has occurred. Accordingly, the recipient party can discard the information qubit and/or request retransmission from the sender party.

Figure 4E:
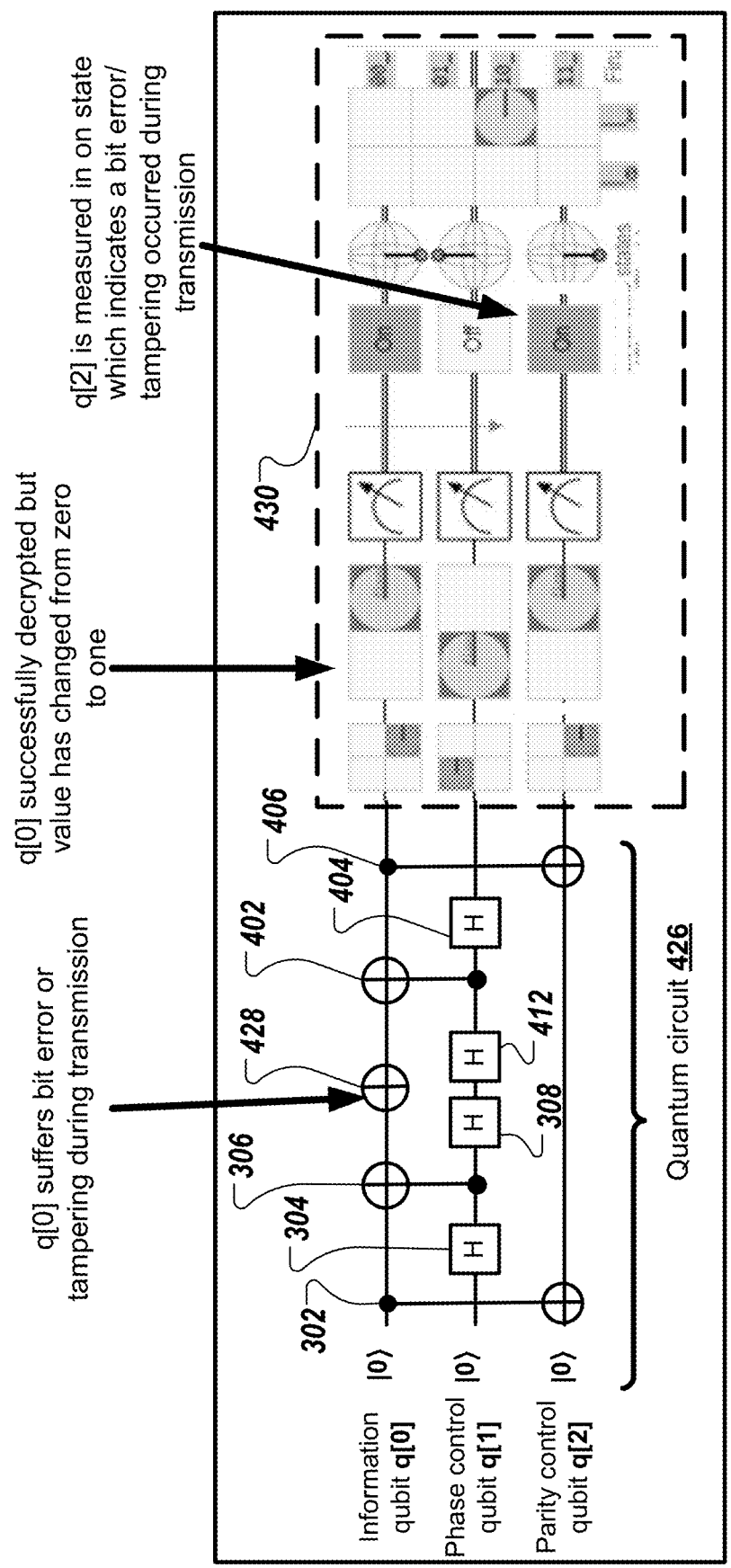

FIG. 4E shows an example quantum circuit 426 for decrypting an information qubit that has been encrypted using example quantum circuit 300 of FIG. 3A. Accordingly, the example quantum circuit 426 also operates on an information qubit q[0] that encodes quantum information, a phase control qubit q[1] and a parity control qubit q[2].

The example quantum circuit 426 shows the quantum logic gates 302-308 described above with reference to FIG. 3A that are used to encrypt the information qubit q[0]. The example quantum circuit 426 also shows the quantum logic gates 412, 402-406 described above with reference to FIG. 4C that are used to successfully decrypt the information qubit q[0]. However, example quantum circuit 426 also includes a NOT gate 428 that is applied to the information qubit q[0].

NOT gate 428 can represent a bit error that could have occurred during transmission from the sender party to the recipient party, or malicious tampering performed by an eavesdropper. The NOT gate 428 flips the value of the information qubit q[0]. Therefore, when the information qubit q[0] is measured by the recipient party, the measurement result may indicate an incorrect output state (in this example the one state). However, this error can be detected via measurement of the parity control qubit q[2]. This is shown in box 430.

Box 430 illustrates the statistical properties of the states of the qubits q[0], q[1], and q[2] after the example quantum circuit 426 has been applied. For example, box 430 shows that, if the parity control qubit q[1] were to be measured at this point the measurement would output an eigenvalue corresponding to the one state (the "on" state). That is, the parity control qubit q[2] indicates that an error or tampering has occurred. Accordingly, the recipient party can discard the information qubit and/or request retransmission from the sender party.

FIGS. 4D and 4E could be combined to show how if the information qubit q[0] suffers a bit and phase error or tampering during transmission, all qubits q[0]-q[2] can be measured in an on state, indicating that the bit and phase error or tampering occurred.

Figure 5:
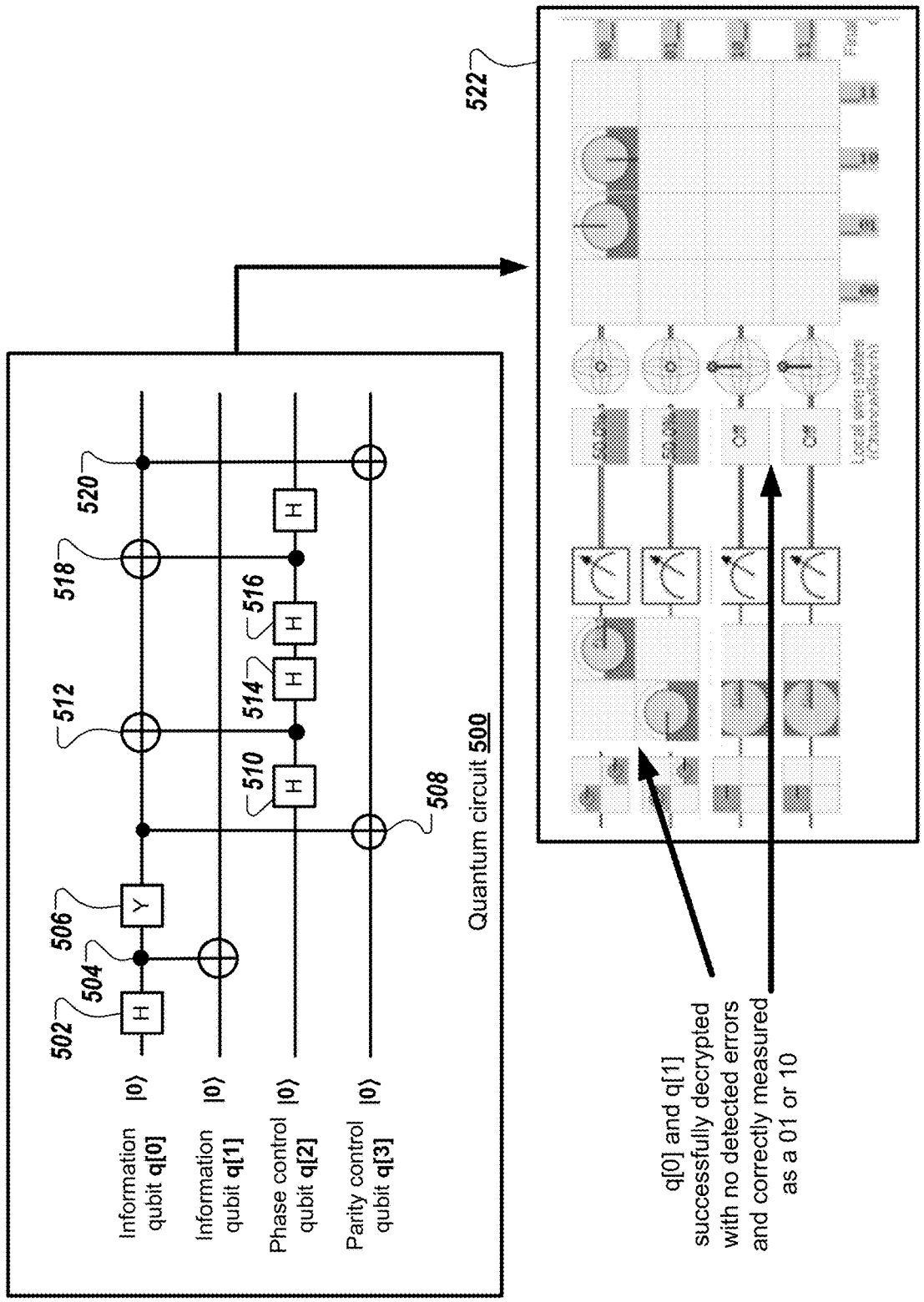
FIG. 5 shows an example quantum circuit for encrypting and decrypting an entangled pair of information qubits.

The presently described techniques can be used to encrypt, transmit, and decrypt a pair of entangled information qubits. FIG. 5 shows an example quantum circuit 500 for encrypting and decrypting an entangled pair of information qubits. The example quantum circuit 500 operates on a first information qubit q[0] and second information qubit q[1] that each encode quantum information represented by a zero state, a phase control qubit q[2] and a parity control qubit q[3]. In this example both the phase control qubit and parity control qubit are prepared in a zero state 10).

The example quantum circuit 500 includes a Hadamard gate 502 that is applied to the first information qubit q[0], CNOT gate 504 that targets the second information qubit q[1] and uses the first information qubit q[0] as a control, and a Pauli-Y gate that is applied to the first information qubit q[0]. The operations 502 and 504 entangle the first information qubit q[0] and second information qubit q[1]. The operation 506 causes bell pair measurements of the information qubits to produce 01 or 10 measurement results.

The CNOT gate 508, Hadamard gate 510, CNOT gate 512 perform the parity operation and phase operation on the first information qubit q[0], as described above. The Hadamard gate 514 applied to the phase control qubit corresponds to the secret sequence of quantum logic gates. The operations 516-520 correspond to inverses of the secret sequence of quantum logic gates, parity operation and phase operation.

Box 522 illustrates the statistical properties of the states of the qubits q[0], q[1], q[2] and q[3] after the example quantum circuit 500 has been applied. For example, box 522 shows that, if the information qubits were to be measured (in this example in the computational eigenbasis) at this point they would correctly output either a 01 or 10 result and that the phase control qubit and parity control qubit would indicate no detected errors.

Figure 6:
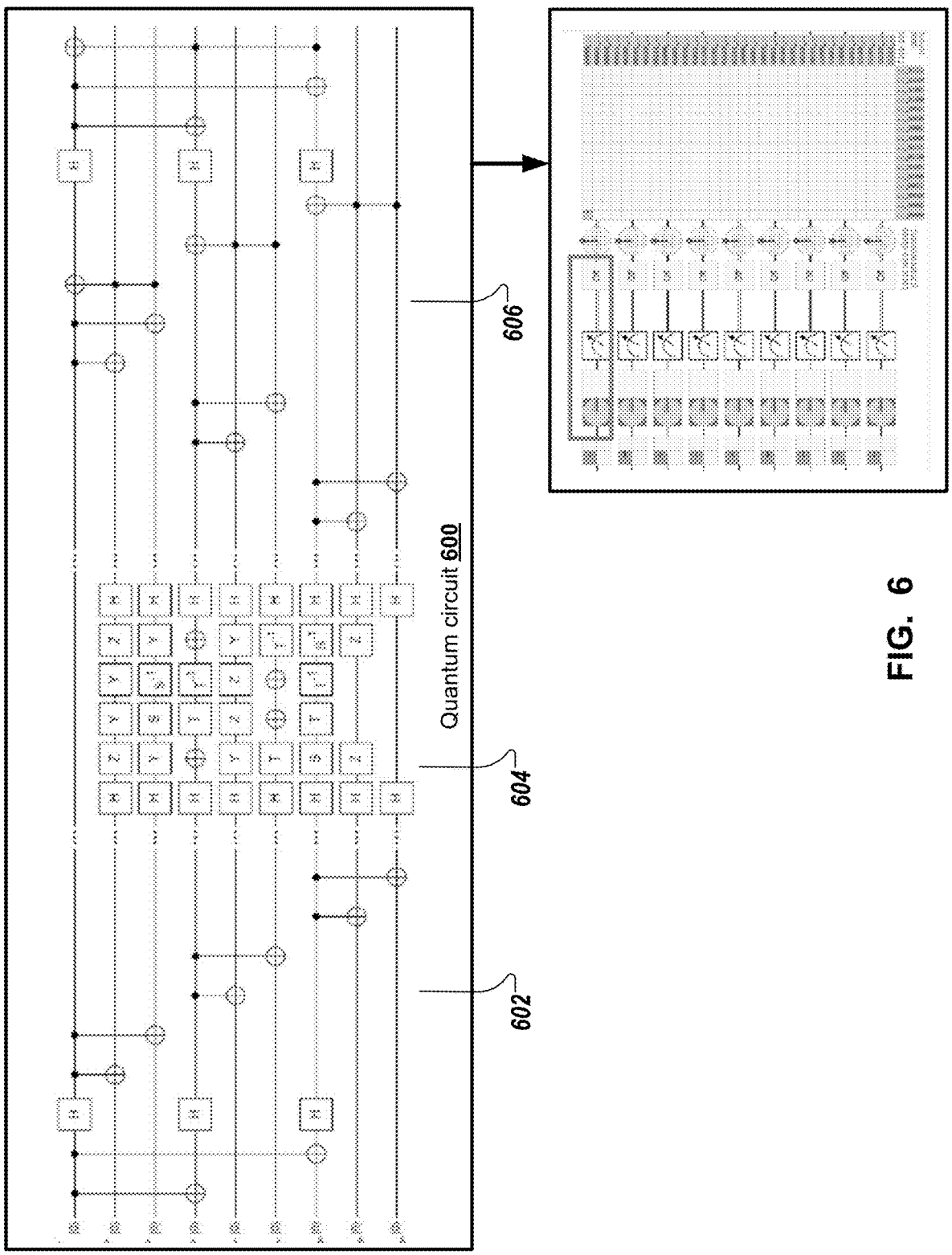
FIG. 6 shows an example quantum circuit for encrypting and decrypting an information qubit using multiple pairs of error control qubits

The presently described techniques can be used to encrypt, transmit, and decrypt a single information qubit or pair of entangled information qubits using multiple pairs of error control qubits. FIG. 6 shows an example quantum circuit 600 for encrypting and decrypting an information qubit q[0] using 4 pairs of error control qubits, each pair including one parity control qubit and one phase control qubit. The Encryption phase 602 proceeds using the previously described techniques in triplicate—three parity operations are performed on the information qubit and respective parity control qubits and overlapping phase error control qubits are prepared with the Hadamard gates. The secret sequence of gates phase 604 includes application of different sequences of quantum gates to each qubit. The decryption phase 604 reverses the encryption phase 602.

Figure 7:
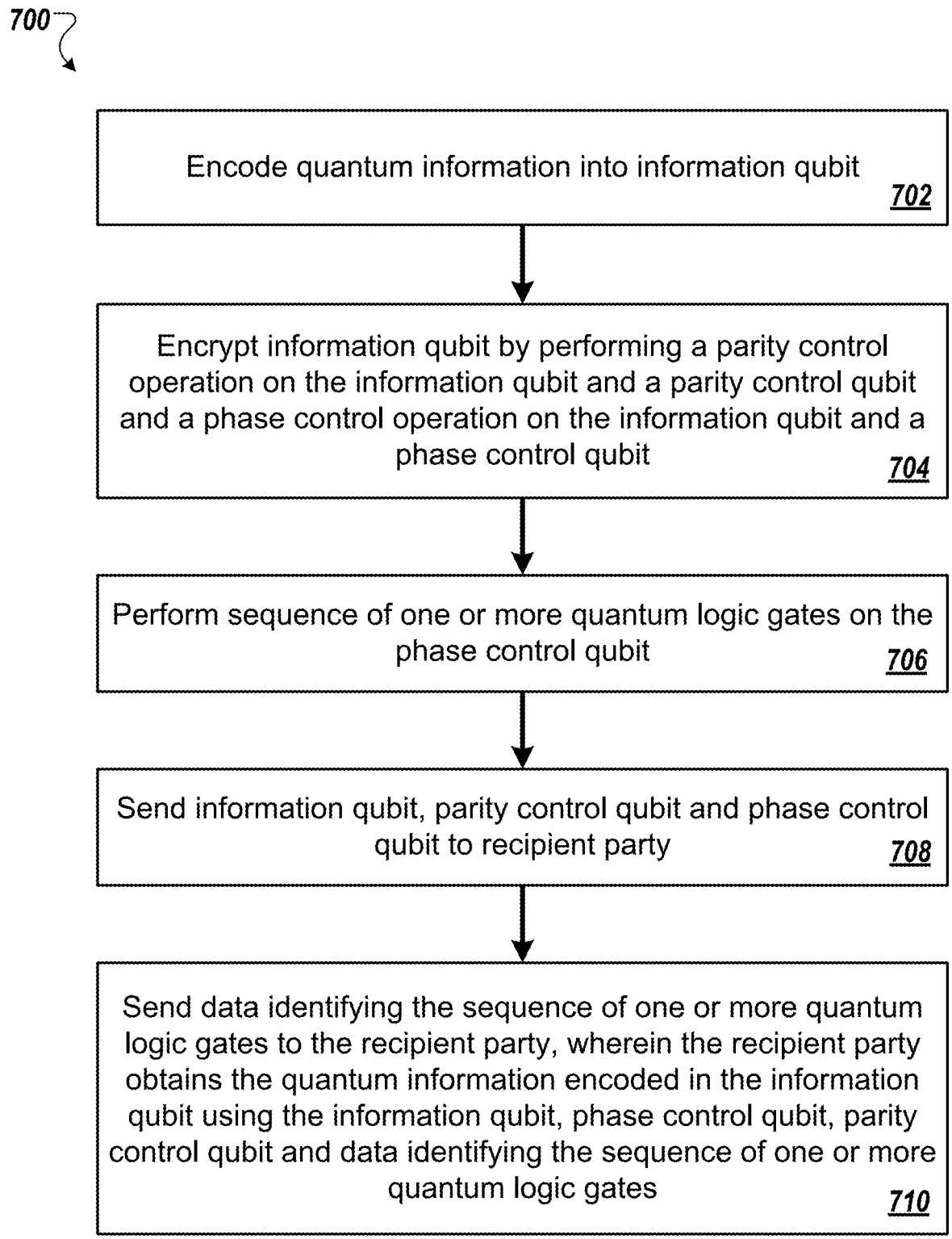
FIG. 7 is a flow diagram of an example process for sending one or more protected qubits encoding quantum information to a recipient party.

FIG. 7 is a flowchart of an example process 700 for sending one or more protected qubits encoding quantum information to a recipient party. For convenience, the process 700 will be described as being performed by a sender party that includes one or more classical and quantum computing devices located in one or more locations. For example, sender party 102 of FIG. 1, appropriately programmed in accordance with this specification, can perform the process 700.

The system encodes quantum information into one or more information qubits (step 702). For example, the system can encode quantum information into one information qubit or can encode quantum information into an entangled pair of information qubits.

In implementations where quantum information is encoded into an entangled pair of information qubits, the system performs operations to entangle a first information qubit and a second information qubit. For example, the system can apply a Hadamard gate to the first information qubit, apply a CNOT gate to the first information qubit and the second information qubit, where the first information qubit acts as a control and the CNOT gate targets the second information qubit, and apply a Pauli-Y gate to the first information qubit to obtain an entangled pair.

The system encrypts the one or more information qubits (step 704). In implementations where quantum information is encoded into one information qubit at step 702, the system encrypts the information qubit by performing a parity operation on the information qubit and a parity control qubit that has been prepared in an initial state. In some implementations the initial state can be an arbitrary initial state, e.g., a computational basis state or a plus/minus state. The system further performs a phase operation on the information qubit and a phase control qubit prepared in an initial state. In some implementations the initial state can be a computational basis state, however due to interference the initial state may not be a plus state. The initial states of the phase control qubit and parity control qubit can be chosen in advance and communicated to the recipient party (in advance or during example process 700).

In some implementations the parity operation may be a bit flip operation. For example, the parity operation may be a CNOT quantum logic gate that targets the parity control qubit and uses the information qubit as a control. In some implementations the phase operation may be a sign flip operation. For example, the phase operation may be include a Hadamard gate on the phase control qubit and a CNOT quantum logic gate that targets the information qubit and uses the phase control qubit as a control.

In implementations where quantum information is encoded into a entangled pair of information qubits at step 702, the system encrypts the entangled pair of qubits by performing the above described parity control and phase operations on the first information qubit, parity control qubit and phase control qubit.

The system performs a sequence of one or more quantum logic gates on the phase control qubit (step 706). The sequence of one or more quantum logic gates is a secret sequence of quantum logic gates that is known only to the sender party. In some cases the sequence of quantum logic gates may be a predetermined sequence of quantum logic gates, e.g., a sequence selected in advance by the sender party. In other cases the sender party may randomly generate the sequence of quantum logic gates as part of example process 700, e.g., by randomly selecting one or more quantum logic gates from a predetermined set of quantum logic gates.

The sequence of one or more quantum logic gates can include any number of quantum logic gates. Typically, the sequence will include at least one quantum logic gate. However in some implementations the sequence could be chosen to be empty, e.g., to try to trick a potential eavesdropper. The one or more quantum logic gates included in the sequence can include any combination of single-qubit quantum logic gates and can include multiples of a same single-qubit quantum logic gate. For example, the quantum logic gates can include single-qubit quantum logic gates that belong to a set of universal quantum logic gates. However, the system can implement some constraints on the sequence of quantum logic gates. For example, in some implementations the sequence can be chosen to be non-palindromic. As another example, in some implementations the sequence can be chosen such that the sequence does not reverse itself, i.e., the sequence of quantum logic gates is not equivalent to an identity operation. As another example, in some implementations the sequence of quantum logic gates may not be a stabilizer operator from a stabilizer code.

The system sends the one or more information qubits, parity control qubit, and phase control qubit to the recipient party (step 708). In some implementations, to send the one or more information qubits, parity control qubit, and phase control qubit to the recipient party, the system establishes a quantum communication channel with the recipient party and sends the one or more information qubits via the quantum communication channel to the recipient party. The system can then wait to receive an acknowledgement of receipt of the one or more information qubits from the recipient party. In response to receiving an acknowledgement of receipt of the one or more information qubits from the recipient party, the system can verify the acknowledgement. If the verification is successful, the system sends the phase control qubit and bit control qubit to the recipient party via the quantum communication channel. If the verification is not successful, the system can wait to receive another acknowledgement of receipt of the one or more information qubits from the recipient party or terminate the process.

The system sends data identifying the sequence of one or more quantum logic gates to the recipient party (step 710). In some implementations the system sends data identifying the sequence of one or more quantum logic gates to the recipient party over a secure Out-of-Band channel.

Once the recipient party has received the one or more information qubits, parity control qubit, phase control qubit, and data identifying the sequence of one or more quantum logic gates, the recipient party can perform multiple operations using the one or more information qubits, parity control qubit, phase control qubit, and data identifying the sequence of one or more quantum logic gates to obtain the quantum information encoded into the one or more information qubits. Example operations performed by the recipient party are described in detail below with reference to example process 800 of FIG. 8.

For convenience, example process 700 as described above sends one information qubit or an entangled pair of information qubits encoding quantum information to a recipient party. However, in some implementations example process 700 can be used to send a package of multiple information qubits encoding quantum information to a recipient party. For example, in some implementations steps 702-706 can be performed to prepare multiple information qubits or multiple pairs of entangled information qubits. Then, at step 708, the prepared information qubits or pairs of entangled information qubits can be sent to the recipient party via the communication channel in one or more packages. As another example, example process 700 can be repeated to send portions of a total amount of quantum information, e.g., where a subsequent portion of quantum information is sent only after a preceding portion has been sent without error or tampering.

In addition, for convenience, example process 700 as described above uses one parity control qubit and one phase control qubit to send one information qubit or an entangled pair of information qubits encoding quantum information to a recipient party. However, in some implementations multiple pairs of parity control qubits and phase control qubits (each pair including a respective parity control qubit and a respective phase control qubit) can be used to send one information qubit or an entangled pair of information qubits encoding quantum information to a recipient party. In these implementations, step 704 can be performed for each pair of parity control qubits and phase control qubits, step 706 can be performed for each phase control qubit, and at step 708 each pair of parity control qubits and phase control qubits can be sent to the recipient party, so that the recipient party can perform multiple operations using the information qubit or entangled pair of information qubits, parity control qubits, phase control qubits, and data identifying the sequence of one or more quantum logic gates to obtain the quantum information encoded into the one or entangled pair of information qubits.

Figure 8:
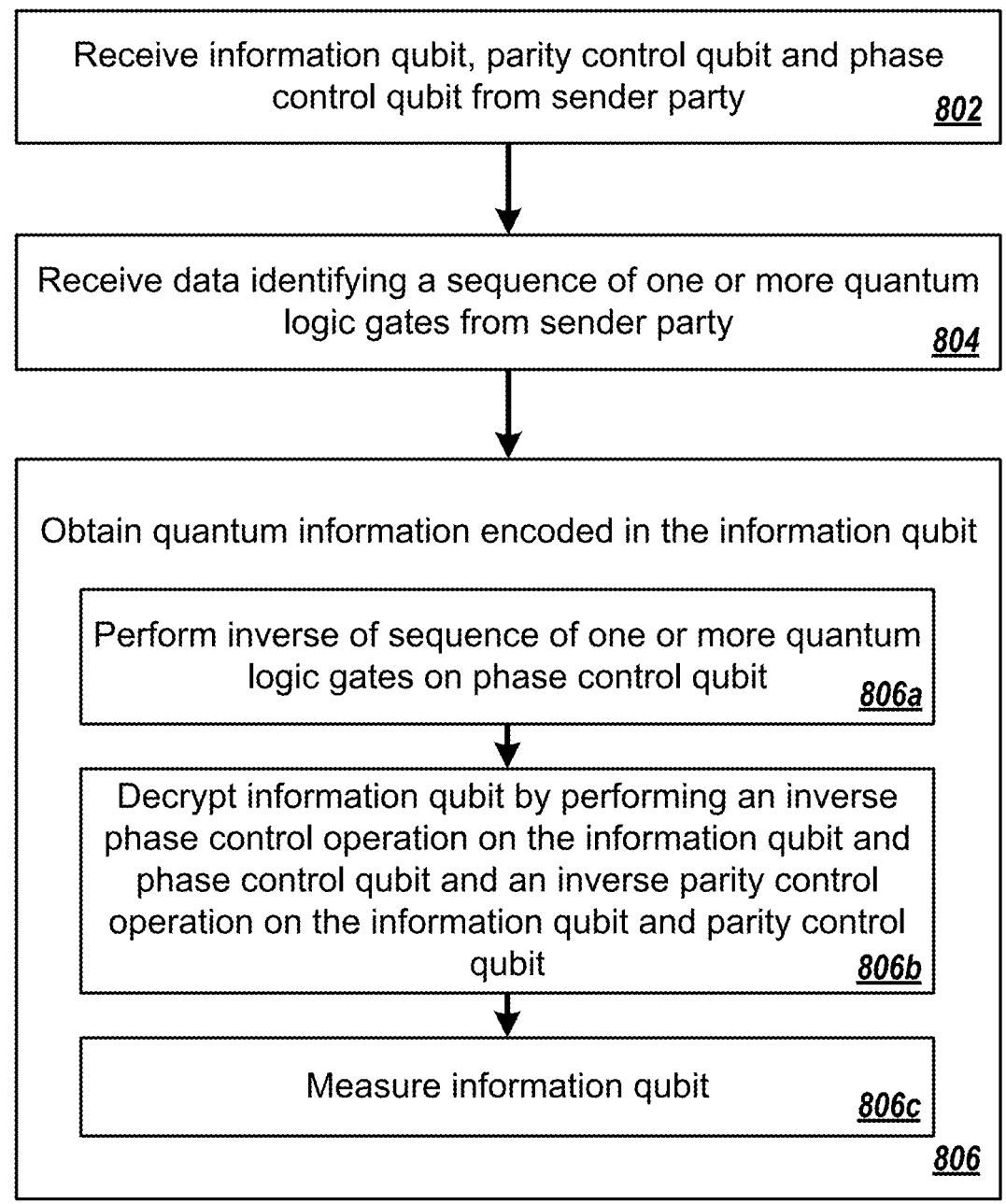
FIG. 8 is a flow diagram of an example process for obtaining quantum information encoded in one or more protected qubits received from a sender party.

FIG. 8 is a flowchart of an example process 800 for obtaining quantum information encoded in one or more protected qubits received from a sender party. For convenience, the process 800 will be described as being performed by a recipient party that includes one or more classical and quantum computing devices located in one or more locations. For example, recipient party 104 of FIG. 1, appropriately programmed in accordance with this specification, can perform the process 800.

The system receives one or more information qubits encoding quantum information, a parity control qubit, and a phase control qubit from a sender party (step 802). For example, the system can receive the one or more information qubits encoding quantum information, the parity control qubit, and the phase control qubit in response to the sender party performing step 708 described above with reference to example process 700.

The system receives data identifying a sequence of one or more quantum logic gates from the sender party (step 804). For example, the system can receive the data identifying the sequence of quantum logic gates in response to the sender party performing step 710 described above with reference to example process 700.

The system obtains the quantum information encoded in the one or more information qubits (step 806). To obtain the quantum information encoded in the one or more information qubits, the system performs an inverse of the sequence of one or more quantum logic gates specified by the data received at step 804 on the phase control qubit received at step 802 (step 806a). The system then decrypts the one or more information qubits by performing an inverse of the phase operation described above with reference to step 704 of example process 700 on the information qubit and phase control qubit, and an inverse parity operation described above with reference to step 704 of example process 700 on the information qubit and the parity control qubit (step 806b). The system then measures the one or more information qubits to obtain the quantum information (step 806c).

In some implementations, before measuring the one or more information qubits, the system can first measure the phase control qubit and bit control qubit to obtain respective measurement results. The system can then determine whether the measurement results indicate that one or both of the phase control qubit and bit control qubit are in an on state or not.

In response to determining that measurement results indicate that one or both of the phase control qubit and bit control qubit are in an on state, the system can determine that the qubits may be erroneous or that tampering has occurred. The system may then request reissue by the sender party.

In response to determining that measurement results indicate that both the phase control qubit and bit control qubit are not in an on state, i.e., both are in an off state, the system can either proceed with step 806c and measure the one or more information qubits to obtain the quantum information encoded in the one or more information qubits, or perform additional operations and delayed measurements on the one or more information qubits to obtain the quantum information encoded in the one or more information qubits.

Figure 9:
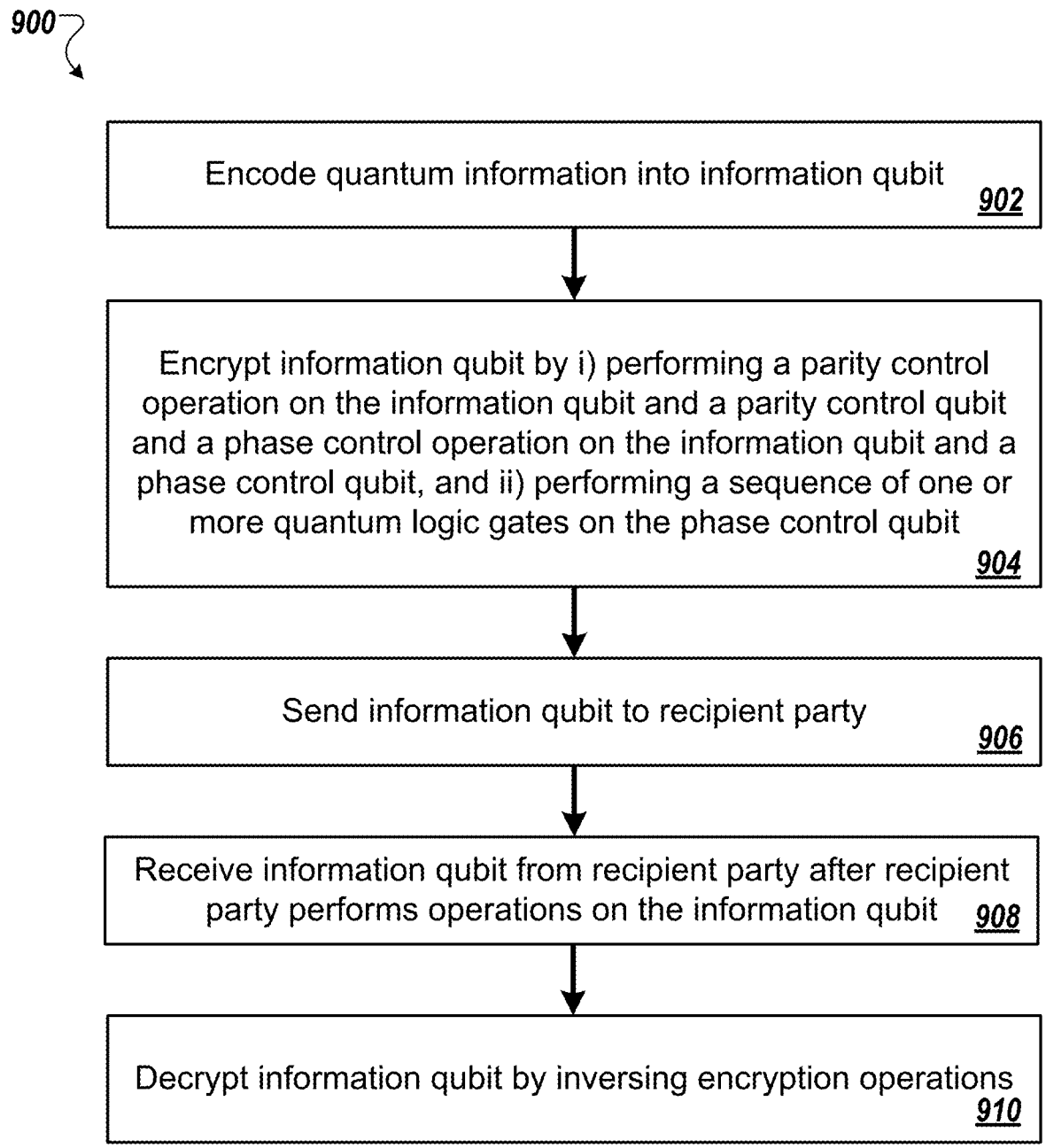
FIG. 9 is a flow diagram of an example process for utilizing a third party to perform quantum algorithms on protected qubits without revealing quantum information encoded by the protected qubits.

FIG. 9 is a flow diagram of an example process for utilizing a third party to perform quantum algorithms on one or more protected qubits without revealing quantum information encoded by the protected qubits. For convenience, the process 900 will be described as being performed by a sender party that includes one or more classical and quantum computing devices located in one or more locations. For example, sender party 102 of FIG. 1A, appropriately programmed in accordance with this specification, can perform the process 900.

The system encodes quantum information into one or more information qubits (step 902). For example, the system can encode quantum information into one information qubit or can encode quantum information into an entangled pair of information qubits. Example operations for encoding quantum information into an entangled pair of information qubits are described above with reference to step 702 of example process 700.

The system encrypts the one or more information qubits (step 904). Example operations for encrypting one or more information qubits are described above with reference to steps 704 and 706 of example process 700.

The system sends the encrypted one or more information qubits to a recipient party (step 906). Example operations for sending encrypted information qubits to a recipient party are described above with reference to step 708 of example process 700. The recipient party performs one or more operations on the one or more encrypted information qubits, as described below with reference to example process 1000 of FIG. 10.

In some implementations the system can further send data identifying a quantum computation to be performed on the encrypted information qubits to the recipient party. The recipient party can then perform the quantum computation on the encrypted information qubits, as described below with reference to example process 1000 of FIG. 10.

The system receives the encrypted one or more information qubits (which have been operated on by the recipient party) from the recipient party (step 908). For example, the system may receive the encrypted one or more information qubits via a same quantum communication channel used to send the qubits at step 906.

The system decrypts the one or more encrypted information qubits (step 910). To decrypt the one or more encrypted information qubits, the system performs an inverse of the operations performed to encrypt the one or more information qubits at step 904. That is, the system performs an inverse of the sequence of one or more quantum logic gates on the phase control qubit, performs an inverse of the parity operation on the information qubit and the parity control qubit, and performs an inverse of the phase operation on the information qubit and phase control qubit.

The system can measure the decrypted one or more information qubits to obtain information stored by the one or more information qubits, or can perform additional operations on the one or more information qubits before measuring the information qubits. In some implementations the system can perform the additional operations on the one or more information qubits before decrypting the one or more information qubits at step 910.

Similarly to example process 700 of FIG. 7, example process 900 is described with reference to sending one information qubit or an entangled pair of information qubits encoding quantum information to a recipient party. However, in some implementations example process 900 can be used to send a package of multiple information qubits to a recipient party. For example, in some implementations steps 902 and 904 can be performed to prepare multiple information qubits or multiple pairs of entangled information qubits. Then, at steps 906 and 908, the prepared information qubits or pairs of entangled information qubits can be sent to and received from the recipient party via the communication channel in one or more packages.

Figure 10:
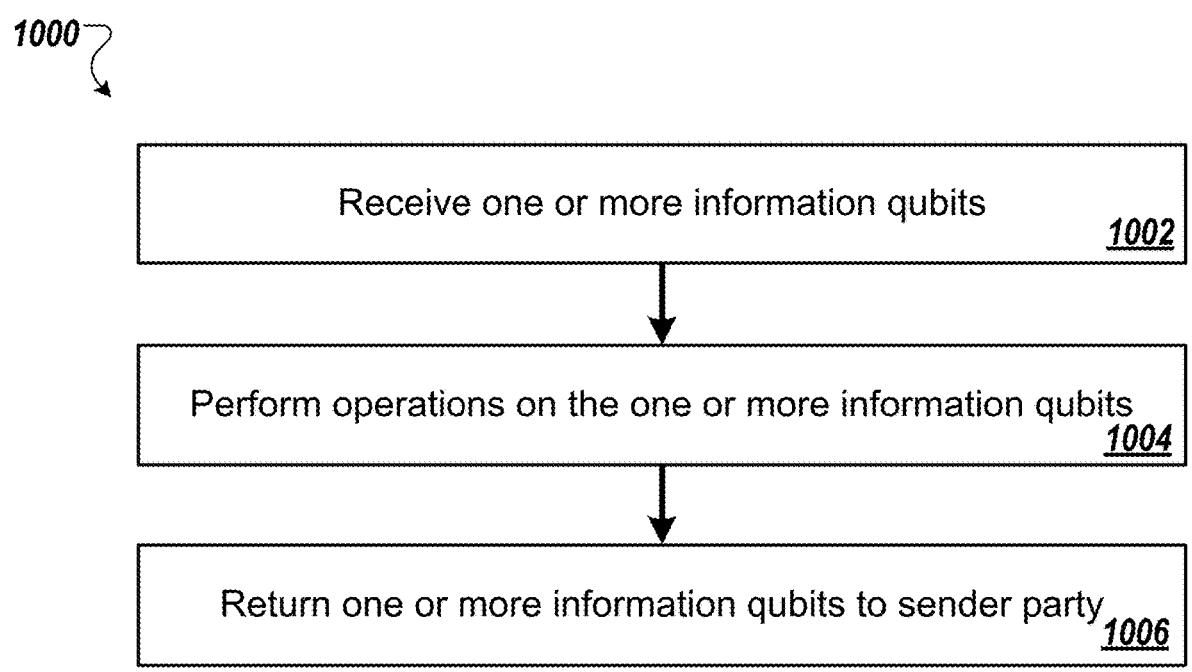
FIG. 10 is a flow diagram of an example process for performing quantum algorithms on protected qubits encoding quantum information.

FIG. 10 is a flow diagram of an example process 1000 for performing quantum algorithms on protected qubits encoding quantum information. For convenience, the process 1000 will be described as being performed by a recipient party that includes one or more classical and quantum computing devices located in one or more locations. For example, recipient party 104 of FIG. 1A, appropriately programmed in accordance with this specification, can perform the process 1000.

The system receives one or more information qubits from a sender party (step 1002). The one or more information qubits are qubits that encode quantum information and are encrypted by performing i) a parity operation on the one or more information qubits and a parity control qubit and ii) a phase operation on the one or more information qubits and a phase control qubit and performing a sequence of one or more quantum logic gates on the phase control qubit, as described above with reference to steps 902 and 904 of example process 900.

The system can also receive data identifying a quantum computation to perform on the one or more information qubits from the sender party.

The system performs operations on the received one or more information qubits (step 1004). For example, the system can perform a quantum computation specified by received data identifying a quantum computation to perform on the received information qubits. In some implementations the system can apply a known quantum algorithm to the information qubits to perform the quantum computation, e.g., the data identifying the quantum computation may specify a particular quantum algorithm to be performed. In other implementations the system can apply a secret quantum algorithm to the information qubits to perform the quantum computation, e.g., the system may implement their own quantum algorithms to perform the quantum computation without disclosing the details of their algorithms.

After the system has performed the operations on the one or more information qubits, the system returns the one or more information qubits to the sender party (step 1006).

Figure 11:
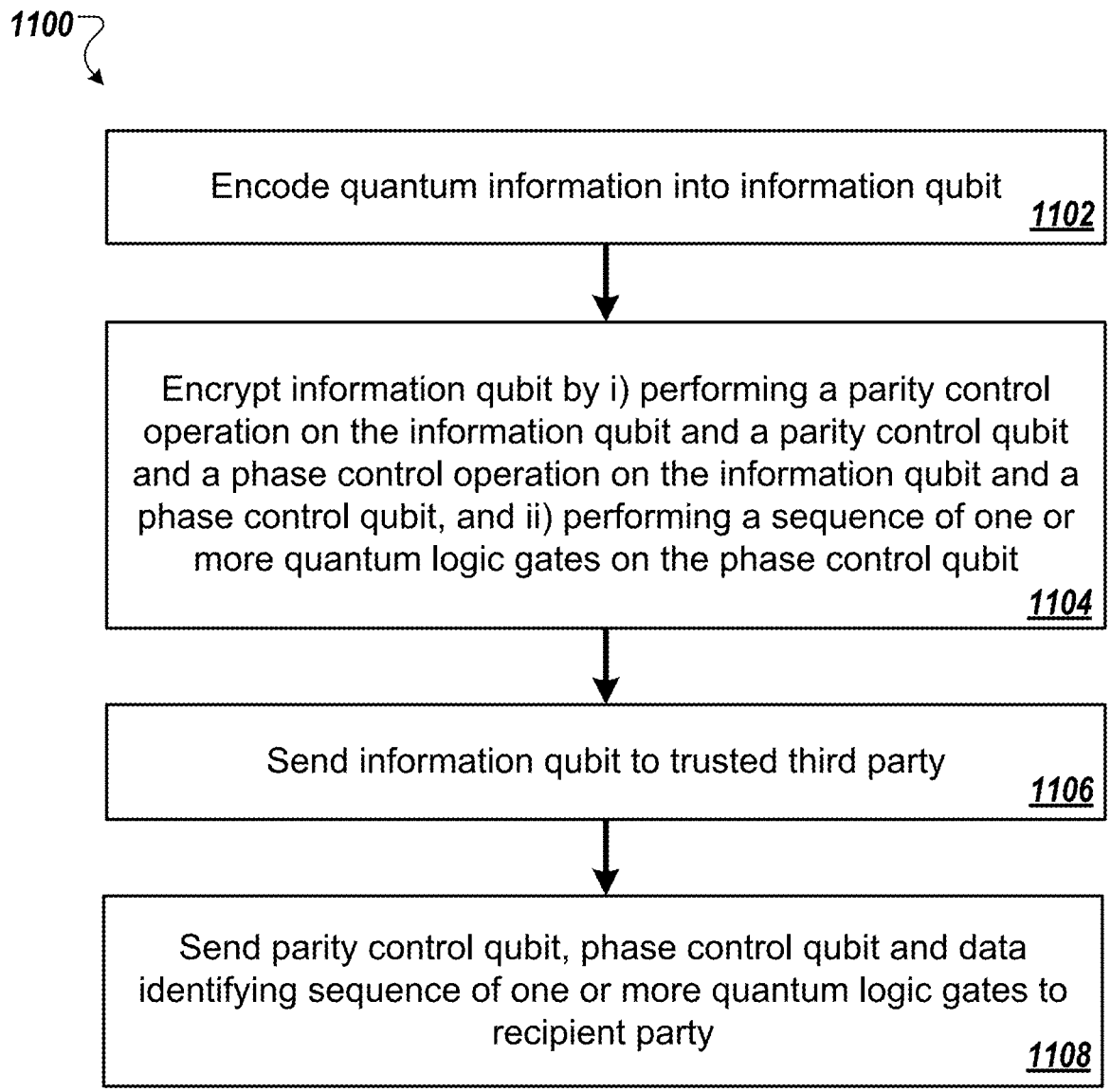
FIG. 11 is a flow diagram of an example process for sending protected qubits that encode quantum information to a recipient party using a quantum smart contract.

FIG. 11 is a flow diagram of an example process for sending protected qubits that encode quantum information to a recipient party using a quantum smart contract. For convenience, the process 1100 will be described as being performed by a sender party that includes one or more classical and quantum computing devices located in one or more locations. For example, sender party 202 of FIG. 2A, appropriately programmed in accordance with this specification, can perform the process 1100.

The system encodes quantum information into one or more information qubits (step 1102). Example operations for encoding quantum information into one or more information qubits are described above with reference to example processes 700 and 900 of FIGS. 7 and 9, respectively.

The system encrypts the one or more information qubits (step 1104). Example operations for encrypting one or more information qubits are described above with reference to example processes 700 and 900 of FIGS. 7 and 9, respectively The system sends the one or more encrypted information qubits to a trusted third party (step 1106). Example operations for sending information qubits are described above with reference to example processes 700 and 900 of FIGS. 7 and 9, respectively. The system can send the one or more encrypted information qubits to the trusted third party after entering a smart contract with the recipient party. For example, the system can first sign terms and conditions of a smart contract with the recipient party and send the trusted third party the signed terms and conditions. The system can then wait to receive verification that both parties have signed the smart contract before sending the one or more encrypted information qubits to the trusted third party.

The system sends the parity control qubit, phase control qubit and data identifying the sequence of one or more quantum logic gates to a recipient party (step 1108). Example operations for sending parity control qubits, phase control qubits and data identifying sequences of one or more quantum logic gates are described above with reference to example processes 700 and 900 of FIGS. 7 and 9, respectively As described in more detail below with reference to FIGS. 12 and 13, the recipient party obtains the quantum information encoded into the encrypted information qubit in response to receiving the encrypted information qubit from the trusted third party after the trusted third party determines that terms and conditions of a smart contract are met and based on the information qubit, parity control qubit, phase control qubit, and data identifying the sequence of one or more quantum logic gates.

Similarly to example processes 700 and 900 of FIGS. 7 and 9, example process 1100 can be used to send one information qubit, an entangled pair of information qubits, or a package of multiple information qubits to a recipient party. For example, in some implementations steps 1102 and 1104 can be performed to prepare multiple information qubits or multiple pairs of entangled information qubits. Then, at step 1106 the prepared information qubits or pairs of entangled information qubits can be sent to the trusted third party party via a communication channel in one or more packages.

Figure 12:
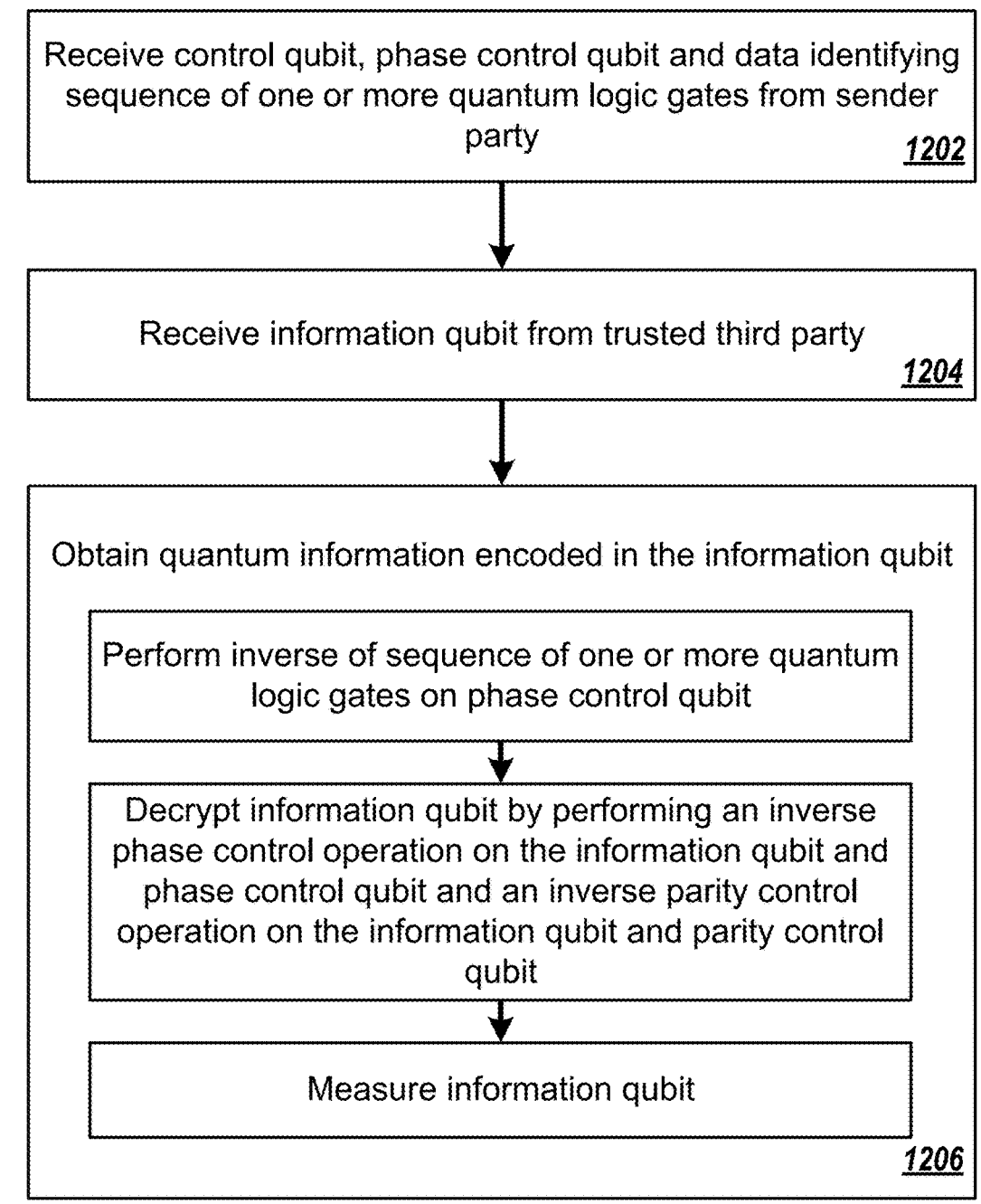
FIG. 12 is a flow diagram of an example process for obtaining quantum information encoded in one or more protected qubits using a quantum smart contract.

FIG. 12 is a flow diagram of an example process 1200 for obtaining quantum information encoded in one or more protected qubits using a quantum smart contract. For convenience, the process 1200 will be described as being performed by a recipient party that includes one or more classical and quantum computing devices located in one or more locations. For example, recipient party 204 of FIG. 2A, appropriately programmed in accordance with this specification, can perform the process 1200.

The system receives a parity control qubit, phase control qubit and data identifying a sequence of one or more quantum logic gates from a sender party (step 1202). The system receives one or more information qubits encoding quantum information from a trusted third party (step 1104). Steps 1202 and 1204 are similar to steps 802, 804 of example process 800 of FIG. 8, and for brevity the details are not repeated.

The system can receive the parity control qubit, phase control qubit, data identifying a sequence of one or more quantum logic gates and one or more encrypted information qubits after entering a smart contract with the sender party. For example, as described above with reference to example process 1100, the system can first sign terms and conditions of a smart contract with the sender party and send the trusted third party the signed terms and conditions.

The system obtains quantum information encoded in the one or more encrypted information qubits (step 1206). Step 1206 is similar to step 806 of example process 800 of FIG. 8, and for brevity the details are not repeated.

Figure 13:
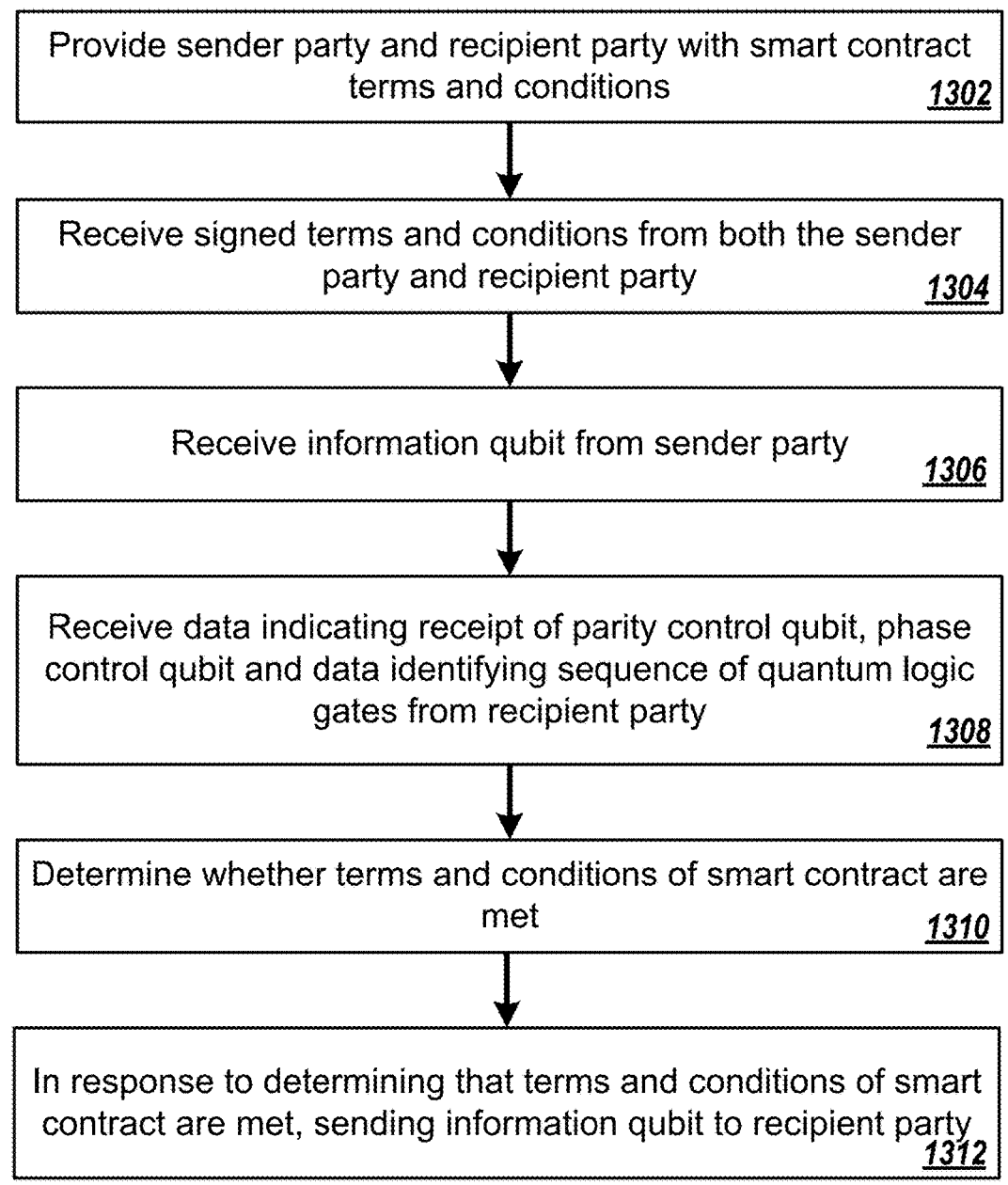
FIG. 13 is a flow diagram of an example process for implementing a quantum smart contract.

FIG. 13 is a flow diagram of an example process for implementing a quantum smart contract. For convenience, the process 1300 will be described as being performed by a trusted third party that includes one or more classical and quantum computing devices located in one or more locations. For example, trusted third party 208 of FIG. 2A, appropriately programmed in accordance with this specification, can perform the process 1300.

The system provides a sender party and recipient part with terms and conditions of a smart contract (step 1302).

The system receives signed terms and conditions of the smart contract from both the sender party and the recipient party (1304). The system can then send each party data indicating that both parties have successfully signed the terms and conditions, and that the smart contract is valid.

The system receives an information qubit from a sender party (step 1306). Step 1302 is similar to step 802 of example process 800 and step 1002 of example process 1000, and for brevity details are not repeated.

The system receives data indicating receipt of i) a parity control qubit, ii) a phase control qubit, and iii) data identifying a sequence of one or more quantum logic gates from a recipient party (step 1308).

The system determines whether terms and conditions of the smart contract between the sender party and recipient party are met (step 1310).

In response to determining that the terms and conditions of the smart contract between the sender party and recipient party are met, the system transmits the information qubit to the recipient party (step 1312).

Figure 14:
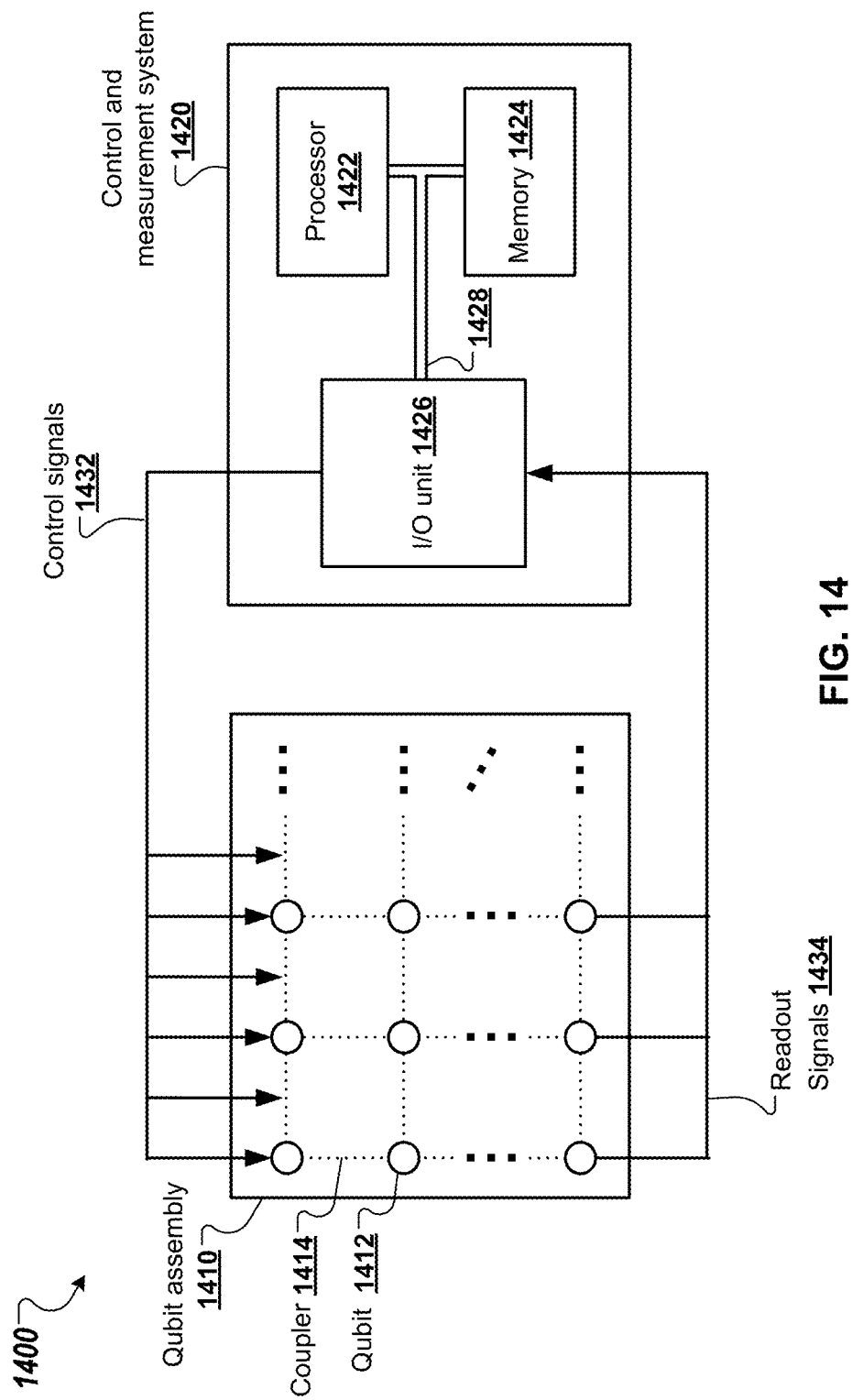
FIG. 14 shows an example an example quantum computing device that may be used to carry out the quantum computing methods described herein.

FIG. 14 is a block diagram of an example quantum computing device 1400. The quantum computing device 1400 can be used to perform the quantum computation operations described in this specification according to some implementations. The quantum computing device 1400 is intended to represent various forms of quantum computing devices. The components shown here, their connections and relationships, and their functions, are exemplary only, and do not limit implementations of the inventions described and/or claimed in this document.

The quantum computing device 1400 includes a qubit assembly 1410 and a control and measurement system 1420. The qubit assembly includes multiple qubits, e.g., qubit 1412, that are used to perform algorithmic operations or quantum computations. While the qubits shown in FIG. 14 are arranged in a rectangular array, this is a schematic depiction and is not intended to be limiting. The qubit assembly 1410 also includes adjustable coupling elements, e.g., coupler 1414, that allow for interactions between coupled qubits. In the schematic depiction of FIG. 14, each qubit is adjustably coupled to each of its four adjacent qubits by means of respective coupling elements. However, this is an example arrangement of qubits and couplers and other arrangements are possible, including arrangements that are non-rectangular, arrangements that allow for coupling between non-adjacent qubits, and arrangements that include adjustable coupling between more than two qubits.

Each qubit can be a two-level quantum system or device having levels representing logical values of 0 and 1. The specific physical realization of the multiple qubits and how they interact with one another is dependent on a variety of factors including the type of the quantum computing device 1400 or the type of quantum computations that the quantum computing device 1400 is performing. For example, in an atomic quantum computer the qubits may be realized via atomic, molecular or solid-state quantum systems, e.g., hyperfine atomic states. As another example, in a superconducting quantum computer the qubits may be realized via superconducting qubits or semi-conducting qubits, e.g., superconducting transmon states. As another example, in a NMR quantum computer the qubits may be realized via nuclear spin states.

In some implementations a quantum computation can proceed by initializing the qubits in a selected initial state and applying a sequence of quantum logic gates to the qubits. Example quantum logic gates include single-qubit gates, e.g., Pauli-X, Pauli-Y, Pauli-Z (also referred to as X, Y, Z), Hadamard and S gates, two-qubit gates, e.g., controlled-X, controlled-Y, controlled-Z (also referred to as CX, CY, CZ), and gates involving three or more qubits, e.g., Toffoli gates. The quantum logic gates can be implemented by applying control signals 1432 generated by the control and measurement system 1420 to the qubits and to the couplers.

For example, in some implementations the qubits in the qubit assembly 1410 can be frequency tuneable. In these examples, each qubit can have associated operating frequencies that can be adjusted through application of voltage pulses via one or more drive-lines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tuneable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The type of control signals 1432 used depends on the physical realizations of the qubits. For example, the control signals may include RF or microwave pulses in an NMR or superconducting quantum computer system, or optical pulses in an atomic quantum computer system.

A quantum computation can be completed by measuring the states of the qubits, e.g., using a quantum observable such as Z, using respective control signals 1434. The measurements cause readout signals 1434 representing measurement results to be communicated back to the measurement and control system 1420. The readout signals 1434 may include RF, microwave, or optical signals depending on the physical scheme for the quantum computing device 1400 and/or the qubits. For convenience, the control signals 1432 and readout signals 1434 shown in FIG. 14 are depicted as addressing only selected elements of the qubit assembly (i.e. the top and bottom rows), but during operation the control signals 1432 and readout signals 1434 can address each element in the qubit assembly 1410.

The control and measurement system 1420 is an example of a classical computer system that can be used to perform various operations on the qubit assembly 1410, as described above. The control and measurement system 1420 includes one or more classical processors, e.g., classical processor 1422, one or more memories, e.g., memory 1424, and one or more I/O units, e.g., I/O unit 1426, connected by one or more data buses, e.g., bus 1426. The control and measurement system 1420 can be programmed to send sequences of control signals 1432 to the qubit assembly, e.g. to carry out a selected series of quantum gate operations, and to receive sequences of readout signals 1434 from the qubit assembly, e.g. as part of performing measurement operations.

The processor 1422 is configured to process instructions for execution within the control and measurement system 1420. In some implementations, the processor 1422 is a single-threaded processor. In other implementations, the processor 1422 is a multi-threaded processor. The processor 1422 is capable of processing instructions stored in the memory 1424.

The memory 1424 stores information within the control and measurement system 1420. In some implementations, the memory 1424 includes a computer-readable medium, a volatile memory unit, and/or a non-volatile memory unit. In some cases, the memory 1424 can include storage devices capable of providing mass storage for the system 1420, e.g. a hard disk device, an optical disk device, a storage device that is shared over a network by multiple computing devices (e.g., a cloud storage device), and/or some other large capacity storage device.

The input/output device 1426 provides input/output operations for the control and measurement system 1420. The input/output device 1426 can include D/A converters, A/D converters, and RF/microwave/optical signal generators, transmitters, and receivers, whereby to send control signals 1432 to and receive readout signals 1434 from the qubit assembly, as appropriate for the physical scheme for the quantum computer. In some implementations, the input/output device 1426 can also include one or more network interface devices, e.g., an Ethernet card, a serial communication device, e.g., an RS-232 port, and/or a wireless interface device, e.g., an 802.11 card. In some implementations, the input/output device 1426 can include driver devices configured to receive input data and send output data to other external devices, e.g., keyboard, printer and display devices.

Although an example control and measurement system 1420 has been depicted in FIG. 14, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Figure 15:
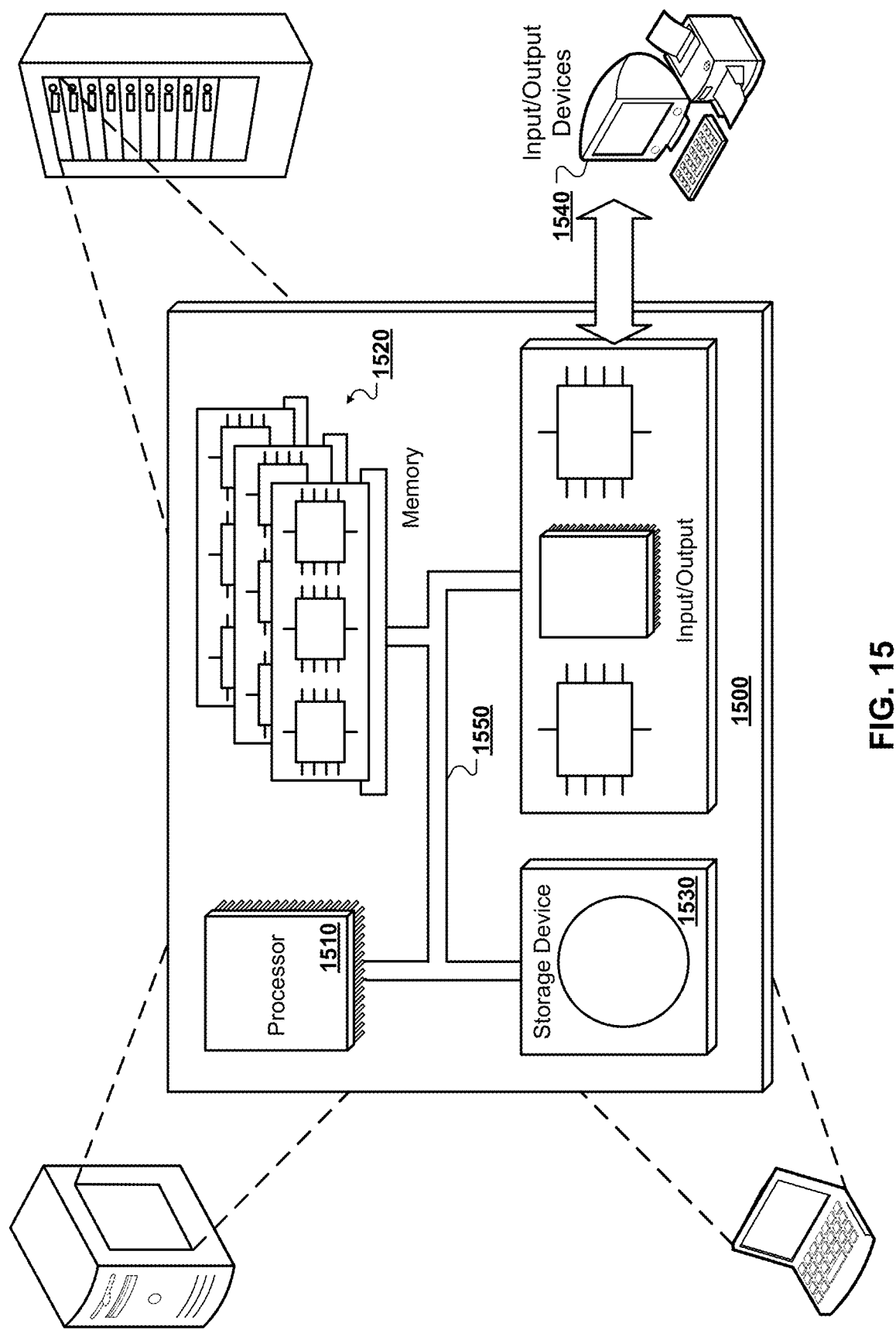
FIG. 15 shows an example classical processor that may be used to carry out the classical computing methods described herein.

FIG. 15 illustrates a schematic diagram of an exemplary generic classical processor system 1500. The system 1500 can be used for the classical operations described in this specification according to some implementations. The system 1500 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 1500 includes a processor 1510, a memory 1520, a storage device 1530, and an input/output device 1540. Each of the components 1510, 1520, 1530, and 1520 are interconnected using a system bus 1550. The processor 1510 may be enabled for processing instructions for execution within the system 1500. In one implementation, the processor 1510 is a single-threaded processor. In another implementation, the processor 1510 is a multi-threaded processor. The processor 1510 may be enabled for processing instructions stored in the memory 1520 or on the storage device 1530 to display graphical information for a user interface on the input/output device 1540.

The memory 1520 stores information within the system 1500. In one implementation, the memory 1520 is a computer-readable medium. In one implementation, the memory 1520 is a volatile memory unit. In another implementation, the memory 1520 is a non-volatile memory unit.

The storage device 1530 may be enabled for providing mass storage for the system 1500. In one implementation, the storage device 1530 is a computer-readable medium. In various different implementations, the storage device 1530 may be a floppy disk device, a hard disk device, an optical disk device, or a tape device.

The input/output device 1540 provides input/output operations for the system 1500. In one implementation, the input/output device 1540 includes a keyboard and/or pointing device. In another implementation, the input/output device 1540 includes a display unit for displaying graphical user interfaces.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a mark-up language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    encoding, by a sender party, quantum information into an information qubit;
    encrypting, by the sender party, the information qubit, comprising performing i) a parity operation on the information qubit and a parity control qubit and ii) a phase operation on the information qubit and a phase control qubit;
    performing, by a sender party, a sequence of one or more quantum logic gates on the phase control qubit;
    sending, by the sender party, the information qubit, parity control qubit, and phase control qubit to a recipient party; and
    sending, by the sender party, data identifying the sequence of one or more quantum logic gates to the recipient party, wherein the recipient party obtains the quantum information encoded into the information qubit based on the information qubit, parity control qubit, phase control qubit, and data identifying the sequence of one or more quantum logic gates.

2. The method of claim 1, wherein the parity operation comprises a CNOT quantum logic gate that targets the parity control qubit and uses the information qubit as a control.

3. The method of claim 1, wherein the phase operation comprises a sign flip operation.

4. The method of claim 3, wherein performing the phase operation on the information qubit and the phase control qubit comprises:
    applying a Hadamard gate to the phase control qubit; and
    applying a CNOT quantum logic gate that targets the information qubit and uses the phase control qubit as a control.

5. The method of claim 1, wherein the sequence of one or more quantum logic gates comprises a non-palindromic sequence of one or more quantum logic gates.

6. The method of claim 1, wherein the sequence of one or more quantum logic gates comprises a secret sequence of one or more quantum logic gates known only to the sender party.

7. The method of claim 1, wherein the one or more quantum logic gates in the sequence of one or more quantum logic gates comprise quantum logic gates from a set of universal quantum logic gates.

8. The method of claim 1, wherein the method further comprises determining, by the sender party, the sequence of one or more quantum logic gates, comprising randomly selecting the one or more quantum logic gates from a predetermined set of quantum logic gates.

9. The method of claim 1, wherein the sequence of one or more quantum logic gates comprises a predetermined sequence of one or more quantum logic gates.

10. The method of claim 1, wherein sending, by the sender party, the information qubit, parity control qubit, and phase control qubit to the recipient party comprises:
    establishing a communication channel with the recipient party;
    sending, from the sender party and to the recipient party, the information qubit via the communication channel;
    receiving, by the sender party and from the recipient party, an acknowledgement of receipt of the information qubit;
    sending, from the sender party and to the recipient party, the phase control qubit and bit control qubit via the communication channel.

11. The method of claim 1, wherein sending data identifying the sequence of one or more quantum logic gates to the recipient party comprises sending data identifying the sequence of one or more quantum logic gates to the recipient party over a secure Out-of-Band channel.

12. The method of claim 1, wherein obtaining, by the recipient party, the quantum information encoded into the information qubit based on the information qubit, parity control qubit, phase control qubit, and data identifying the sequence of one or more quantum logic gates comprises:
    performing a reverse of sequence of one or more quantum logic gates on the phase control qubit;
    performing i) a reverse of the parity operation on the information qubit and the parity control qubit and ii) a reverse of the phase operation on the information qubit and the phase control qubit;
    measuring the phase control qubit and bit control qubit to obtain respective measurement results;
    determining whether the measurement results indicate that both the phase control qubit and bit control qubit are in an off state or not; and
    in response to determining that measurement results indicate that both the phase control qubit and bit control qubit are not in an off state, requesting reissue by the sender party; or
    in response to determining that measurement results indicate that both the phase control qubit and bit control qubit are in an off state, either i) measuring the information qubit, or ii) performing additional operations and delayed measurements on the information qubit.

13. The method of claim 1, wherein phase control qubit is prepared in an initial state, the initial state comprising a computational basis state.

14. A computer implemented method comprising:
encoding, by a sender party, quantum information into an information qubit;
encrypting, by the sender party, the information qubit, comprising performing i) a parity operation on the information qubit and a parity control qubit and ii) a phase operation on the information qubit and a phase control qubit;
performing, by a sender party, a sequence of one or more quantum logic gates on the phase control qubit, wherein the sequence of one or more quantum logic gates is i) non-equivalent to an identity operation, ii) non-equivalent to a stabilizer operator from a stabilizer code, or iii) non-equivalent to an identity operation and non-equivalent to a stabilizer operator from a stabilizer code;
sending, by the sender party, the information qubit, parity control qubit, and phase control qubit to a recipient party; and
sending, by the sender party, data identifying the sequence of one or more quantum logic gates to the recipient party, wherein the recipient party obtains the quantum information encoded into the information qubit based on the information qubit, parity control qubit, phase control qubit, and data identifying the sequence of one or more quantum logic gates.

15. A computer implemented method comprising:
encoding, by a sender party, quantum information into an information qubit, wherein the information qubit comprises a first information qubit;
encoding, by the sender party, quantum information into a second information qubit;
entangling, by the sender party, the first information qubit and second information qubit;
encrypting, by the sender party, the first information qubit, comprising performing i) a parity operation on the first information qubit and a parity control qubit and ii) a phase operation on the first information qubit and a phase control qubit;
performing, by the sender party, a sequence of one or more quantum logic gates on the phase control qubit;
sending, by the sender party, the information qubit, parity control qubit, and phase control qubit to a recipient party;
sending, by the sender party, the second information qubit to the recipient party; and
sending, by the sender party, data identifying the sequence of one or more quantum logic gates to the recipient party, wherein the recipient party obtains the quantum information encoded into the first information qubit and second information qubit based on the first information qubit, second information qubit, parity control qubit, phase control qubit, and data identifying the sequence of one or more quantum logic gates.

16. The method of claim 15, wherein entangling the first information qubit and second information qubit comprises:
applying a Hadamard gate to the first information qubit;
applying a CNOT gate to the first information qubit and the second information qubit, wherein the first information qubit acts as a control and the CNOT gate targets the second information qubit; and
applying a Pauli-Y gate to the first information qubit.

17. A computer implemented method comprising:
encoding, by a sender party, quantum information into an information qubit;
encrypting, by the sender party, the information qubit, comprising performing i) a parity operation on the information qubit and a parity control qubit and ii) a phase operation on the information qubit and a phase control qubit, wherein the parity control qubit comprises a first parity control qubit and the phase control qubit comprises a first phase control qubit and wherein encrypting the information qubit further comprises performing i) the parity operation on the information qubit and a second parity control qubit and ii) the phase operation on the information qubit and a second phase control qubit;
performing, by the sender party, a sequence of one or more quantum logic gates on the second phase control qubit; and
sending, by the sender party, data identifying the sequence of one or more quantum logic gates, the information qubit, the first parity control qubit, the first phase control qubit, the second parity control qubit and the second phase control qubit to a recipient party, wherein the recipient party obtains the quantum information encoded into the information qubit based on the information qubit, first parity control qubit, first phase control qubit, second parity control qubit, second phase control qubit and data identifying the sequence of one or more quantum logic gates.

18. A system comprising:
one or more classical processors; and
quantum computing hardware;
wherein the system is configured to perform operations comprising:
encoding, by a sender party, quantum information into an information qubit;
encrypting, by the sender party, the information qubit, comprising performing i) a parity operation on the information qubit and a parity control qubit and ii) a phase operation on the information qubit and a phase control qubit;
performing, by a sender party, a sequence of one or more quantum logic gates on the phase control qubit;
sending, by the sender party, the information qubit, parity control qubit, and phase control qubit to a recipient party; and
sending, by the sender party, data identifying the sequence of one or more quantum logic gates to the recipient party, wherein the recipient party obtains the quantum information encoded into the information qubit based on the information qubit, parity control qubit, phase control qubit, and data identifying the sequence of one or more quantum logic gates.

19. A computer-implemented method comprising:
receiving, by a recipient party and from a sender party, i) an information qubit, ii) a parity control qubit, and iii) a phase control qubit, wherein the information qubit encodes quantum information;
receiving, by the recipient party and from the sender party, data identifying a sequence of one or more quantum logic gates;
obtaining, by the recipient party, the quantum information encoded in the information qubit, comprising:
performing an inverse of the sequence of one or more quantum logic gates on the phase control qubit;
decrypting the information qubit, comprising performing i) an inverse phase operation on the information qubit and phase control qubit and ii) an inverse parity operation on the information qubit and the parity control qubit; and
measuring the information qubit.

20. A system comprising:
one or more classical processors; and
quantum computing hardware;
wherein the system is configured to perform operations comprising:
  receiving, by a recipient party and from a sender party, i) an information qubit, ii) a parity control qubit, and iii) a phase control qubit, wherein the information qubit encodes quantum information;
  receiving, by the recipient party and from the sender party, data identifying a sequence of one or more quantum logic gates;
  obtaining, by the recipient party, the quantum information encoded in the information qubit, comprising:
    performing an inverse of the sequence of one or more quantum logic gates on the phase control qubit;
    decrypting the information qubit, comprising performing i) an inverse phase operation on the information qubit and phase control qubit and ii) an inverse parity operation on the information qubit and the parity control qubit; and
    measuring the information qubit.

* * * * *